(12) United States Patent
Iriguchi et al.

(10) Patent No.: US 6,610,405 B2
(45) Date of Patent: Aug. 26, 2003

(54) GRAIN AGGREGATE AND PRODUCING METHOD THEREOF, AND LIGHT-DIFFUSING AGENT

(75) Inventors: Jiro Iriguchi, Kakogawa (JP); Yasuhiro Yamamoto, Himeji (JP); Shuji Shimizu, Himeji (JP); Masafumi Inoue, Himeji (JP); Hideki Oishi, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 31 days.

(21) Appl. No.: 09/847,367

(22) Filed: May 3, 2001

(65) Prior Publication Data

US 2001/0051268 A1 Dec. 13, 2001

(30) Foreign Application Priority Data

May 12, 2000 (JP) ........................................ 2000-140450

(51) Int. Cl.⁷ .............................. B32B 5/16; B05D 1/02
(52) U.S. Cl. ...................... 428/403; 427/201; 427/222; 427/226; 427/447; 428/407
(58) Field of Search ................................. 428/403, 407; 427/447, 201, 226, 222

(56) References Cited

U.S. PATENT DOCUMENTS

| 3,916,065 | A | * | 10/1975 | Moriconi et al. |
| 4,978,695 | A | | 12/1990 | Hoshino et al. |
| 5,064,938 | A | | 11/1991 | Suzuki et al. |
| 5,094,998 | A | | 3/1992 | Hoshino et al. |
| 5,176,959 | A | * | 1/1993 | Yamada et al. |
| 5,958,302 | A | * | 9/1999 | Cunningham et al. |
| 6,127,456 | A | * | 10/2000 | Montanari et al. |
| 6,312,807 | B1 | * | 11/2001 | Ludwig et al. |
| 6,485,836 | B2 | * | 11/2002 | Reihs et al. |

FOREIGN PATENT DOCUMENTS

| JP | 02-047088 | 2/1990 |
| JP | 02070741 | 3/1990 |
| JP | 05-035124 | 2/1993 |
| JP | 07-198910 | 8/1995 |
| JP | 08-016732 | 1/1996 |
| JP | 08-118830 | 5/1996 |
| JP | 08-121878 | 5/1996 |
| JP | 2559833 | 9/1996 |
| JP | 09-211207 | 8/1997 |
| JP | 09-229202 | 9/1997 |
| JP | 09-304604 | 11/1997 |
| JP | 09-304607 | 11/1997 |
| JP | 11-064611 | 3/1999 |
| JP | 2000-053720 | 2/2000 |

* cited by examiner

Primary Examiner—H. Thi Le
(74) Attorney, Agent, or Firm—Nixon & Vanderhye P.C.; Frank P. Presta

(57) ABSTRACT

A grain aggregate is formed by bonding a plurality of cross-linking polymeric grains via a substance (binder) having a reactive functional group, and alternatively, the grain aggregate is formed by bonding at least two different types of a plurality of grains, thus providing the grain aggregate having the improved heat resistance, solvent resistance, strength and light-diffusing properties. Further, a light-diffusing agent made up of the grain aggregate has the improved light-diffusing properties. Therefore, when applying a light-diffusing mold article including the light-diffusing agent to, for example, a backlight of a liquid crystal display device, high brightness and a wide angle of visibility can be attained. Further, by spray drying of a dispersion liquid containing the grain aggregate, the grain aggregate can be produced with ease.

22 Claims, 10 Drawing Sheets

(5 of 10 Drawing Sheet(s) Filed in Color)

(PMMA-family CROSS-LINKING POLYMERIC GRAINS/EPOCROSS K2020E/EPOSTAR M30)

(PMMA-family CROSS-LINKING POLYMERIC GRAINS/EPOCROSS K2020E/EPOSTAR L15)

(PMMA-family CROSS-LINKING POLYMERIC GRAINS/EPOSTAR M30 : BLENDED)

(PMMA-family CROSS-LINKING POLYMERIC GRAINS/EPOSTAR L15 : BLENDED)

PMMA-family CROSS-LINKING POLYMERIC GRAIN

EPOSTAR L15

(EPOSTAR L15)

GRAIN AGGREGATE AND PRODUCING METHOD THEREOF, AND LIGHT-DIFFUSING AGENT

FIELD OF THE INVENTION

The present invention relates to (i) a light-diffusing agent for use in, for example, a mold article having light-diffusing properties such as a light-diffusing film and a light-diffusing panel for a backlight or illuminating device of a liquid crystal display, (ii) a grain aggregate which can preferably be adopted as various surf ace treatment agents such as a matte agent and a coating material, a catalyst carrier, an additive of a resin molded material and the like, and (iii) a producing method of the grain aggregate.

BACKGROUND OF THE INVENTION

A grain aggregate is widely used in a coating material, various surface treatment agents, a catalyst carrier, an additive of a resin mold material and others. What has been highly called for in recent years is a grain aggregate of cross-linking polymeric grains having higher heat resistance, higher strength, and higher solvent resistance. The grain aggregate can be produced by, for example, a method disclosed in the Publication of Japanese Patent No. 2559833 (Date of patent: Sep. 5, 1996). According to this publication, grains are fused by adding a solvent after aggregating a polymer latex. However, this method employs an organic solvent, thereby requiring processing of the organic solvent. Further, when producing the grain aggregate of the cross-linking polymeric grains by this method, there arises such a problem that the fusion of the cross-linking polymeric grains can hardly occur by an application of heat, thereby preventing an easy formation of an aggregate.

The grain aggregate of the cross-linking polymeric grains can be produced by, for example, a method disclosed in Japanese Unexamined Patent Publication No. 70741/1990 (Tokukaihei 2-70741 published on Mar. 9, 1990). In this publication, a polymer including a carboxylic unsaturated acid is neutrally swollen so that it can be used as a seed grain, and as a second step, an emulsion-polymerization of a polymer having a composition different from that of the polymer of the seed grain is carried out so as to obtain a grain aggregate of the cross-linking polymeric grains.

However, by this method, in the emulsion-polymerization at the second step, a condition to avoid generation of a new grain should be selected. Thus, there arises a problem of limitation in composition of a polymer and/or a polymerization condition. A further problem is that the resultant grain aggregate is poor in strength and easily destroyed.

As explained, neither methods for easily producing a grain aggregate of the cross-linking polymeric grains nor a grain aggregate with the high strength have conventionally been known.

Further, the inventors of the present invention have formerly discovered that a cross-linking polymeric grain can efficiently be obtained by adopting a spray drying method to dry cross-linking polymeric grains obtained from polymerization of a mixture of vinyl-family monomers including monomers having cross-linking characteristics such as divinylbenzene and trimethylolpropane tri(meth)acrylate (Japanese Unexamined Patent Publication No. 53720/2000 [Tokukai 2000-53720 published on Feb. 22, 2000]). By this method can be obtained such a grain aggregate that has high heat resistance and high strength, maintains the shape of a cross-linking polymeric grain, and has a large specific surface area. However, recently, a demand for a further improvement in the heat resistance and the solvent resistance of the grain aggregate has been increasing.

Meanwhile, conventionally, a variety of liquid crystal display devices have been adopting a backlight to project light from a rear side of a liquid crystal. Particularly, devices such as a laptop PC which has been required to further reduce a volume and a size adopts a method for propagating light by means of a sidelit surface light source device so that the light is uniformly diffused by a light-diffusing film and the like. The light-diffusing film is commonly produced by a method for coating a surface of a transparent film which is a base material with a mixture of inorganic or organic grains and binders. Further, a light-diffusing panel is produced by a method for coating a surface of a transparent panel of glass, plastic or like with a mixture of inorganic or organic grains and binders, or a method for molding the panel by blending a resin such as a polyester resin or epoxy resin with grains.

However, the conventional light-diffusing film and light-diffusing panel have a problem such that a distribution of brightness fluctuates in accordance with a difference in angle with respect to a light projecting surface. Therefore, an improvement has been made to propagate the light by uniformly diffusing it while enhancing light transmissivity. More specifically, methods for such an improvement includes, for example, a method adopting a grain made of an organic substance, which is completely spherical in shape, for improving a ratio of grains to binders when blending the grains and the binders so as to coat the surface of the film or panel (Japanese Unexamined Patent Publication No. 35124/1993 [Tokukaihei 5-35124 published on Feb. 12, 1993]; Japanese Unexamined Patent Publication No. 16732/1996 [Tokukaihei 8-16732 published on Jan. 19, 1996]), a method for improving the shape of a surface to be coated (Japanese Unexamined Patent Publication No. 118830/1996 [Tokukaihei 8-118830 published on May 14, 1996]; Japanese Unexamined Patent Publication No. 121878/1996 [Tokukaihei 8-121878 published on May 17, 1996]), and a method for improving a burial state of grains under a surface to be coated (Japanese Unexamined Patent Publication No. 229202/1997 [Tokukaihei 9-229202 published on Sep. 5, 1997]), where particularly a coating method has been examined in various forms. A method for improving a grain itself, however, has not been taken into consideration. Accordingly, a current problem of the light-diffusing film and the light-diffusing panel is that they have not attained a sufficient distribution of brightness and light transmissivity.

SUMMARY OF THE INVENTION

It is a first object of the present invention to provide a grain aggregate having higher heat resistance, higher solvent resistance, higher strength, higher light-diffusing properties, and a large specified surface area, and a method for readily producing the grain aggregate.

In order to attain the foregoing object, the grain aggregate according to the present invention is made up of a plurality of cross-linking polymeric grains bonding together via a substance having a reactive functional group.

With this arrangement, a grain aggregate having strong bonding among the cross-linking polymeric grains can be obtained, thereby making it possible to provide a grain aggregate having the greatly improved heat resistance, solvent resistance, strength and light-diffusing properties, and the large specific surface area.

Further, in order to attain the foregoing object, the grain aggregate according to the present invention is made up of a plurality of differently composed grains of at least two types bonding together.

With this arrangement, a grain aggregate provided with the respective properties of the plurality of the differently composed grains bonding together can be obtained, thereby making it possible to provide a grain aggregate having the further improved heat resistance, solvent resistance, strength and light-diffusing properties. In addition, the grain aggregate is effective when used in, for example, various surface treatment agents such as a coating material, a matte agent and a light-diffusing agent, a catalyst carrier, an additive of a resin mold material, and others.

In order to attain the foregoing object, a producing method of the grain aggregate according to the present invention includes the step of drying by spraying a dispersion liquid containing the cross-linking polymeric grains and a substance having a reactive functional group.

The spraying is performed under no particularly limited conditions, insofar as the shape and drying condition of the obtained grain aggregate are not adversely affected. More specifically, for example, depending on a shape of a nozzle used in the spraying, the dispersion liquid containing the cross-linking polymeric grains and the substance having a reactive functional group may separately be dried by spraying with different nozzles. Most preferable is the spray drying of a blend liquid of the dispersion liquid containing the cross-linking polymeric grains and the substance having a reactive functional group.

With this arrangement, by the spray drying of the blend liquid of the dispersion liquid containing the cross-linking polymeric grains and the substance having the reactive functional group, there can be formed a grain aggregate in which the plurality of cross-linking polymeric grains more efficiently bond together via the substance having a reactive functional group, thereby making it possible to further improve heat resistance, solvent resistance, strength and light-diffusing properties. In addition, by the spray drying can readily be obtained a grain aggregate while maintaining the individual shape of the cross-linking polymeric grain before the formation of the grain aggregate, thereby readily producing a grain aggregate having a large specific surface area.

Further, in order to attain the foregoing object, the producing method of the grain aggregate according to the present invention includes the step of drying by spraying at least two different types of dispersion liquids each containing a plurality of grains. More preferably, in order to attain the foregoing object, the producing method of the grain aggregate according to the present invention includes the step of drying by spraying a dispersion liquid which is containing at least two different types of a plurality of grains.

In addition, the producing method of the grain aggregate according to the present invention also includes the step of drying by spraying a dispersion liquid containing the plurality of grains and a substance having a reactive functional group. For example, the plurality of grains may be made of either an organic substance or an inorganic substance. More specifically, by allowing grains made of an organic substance, such as differently composed cross-linking polymeric grains and/or cross-linking resin grains, and/or grains made of an inorganic substance which is silica and the like to bond together via a substance having a reactive functional group, a grain aggregate having a combination of different properties can be attained, thereby easily producing a grain aggregate having the further improved heat resistance, solvent resistance, strength and light-diffusing properties. Further, it is more preferable that each of the plurality of grains may at least be a grain selected from the group consisting of a cross-linking polymeric grain, a cross-linking resin grain and an inorganic grain. More preferably, the plurality of grains essentially consist of an organic substance. Alternatively, it is more preferable that the plurality of grains essentially consist of an organic substance and an inorganic substance.

It is a second object of the present invention to provide a light-diffusing agent containing the grain aggregate and having high transmissivity and sufficient light-diffusing properties, and a light-diffusing mold article containing the light-diffusing agent, such as a light-diffusing film and a light-diffusing panel. Further, a third object of the present invention is to provide a liquid crystal panel adopting the light-diffusing film.

In order to attain the foregoing object, the light-diffusing agent according to the present invention includes a grain aggregate in which a plurality of cross-linking polymeric grains bond together.

Further, in order to attain the foregoing object, the light-diffusing agent according to the present invention includes at least two different types of grain aggregates respectively made up of a plurality of grains bonding together.

With this arrangement, the light-diffusing agent has superior light-diffusing properties and light transmissivity per grain aggregate while being light in weight, thereby requiring a smaller amount of addition so as to be highly effective than a conventional light-diffusing agent.

The light-diffusing mold article according to the present invention includes the light-diffusing agent.

With this arrangement, by thus including the grain aggregate having the improved light-diffusing properties, it is possible to provide the light-diffusing agent and light-diffusing mold article both having the further improved light-diffusing properties. In addition, in the case where the light-diffusing agent of the present invention is used to produce a light-diffusing mold article which is then applied to a backlight and the like of a liquid crystal display device, high brightness and a wide angle of visibility can be attained.

Additional objects, features, and strengths of the present invention will be made clear by the description below. Further, the advantages of the present invention will be evident from the following explanation in reference to the drawings.

BRIEF DESCRIPTION OF THE DRAWINGS

The Patent Application file contains at least one drawing executed in color. Copies of this Patent or Patent Application Publication with color drawing(s) will be provided by the office upon request and payment of the necessary fee.

DESCRIPTION OF THE EMBODIMENTS

[First Embodiment]

Figure 1:
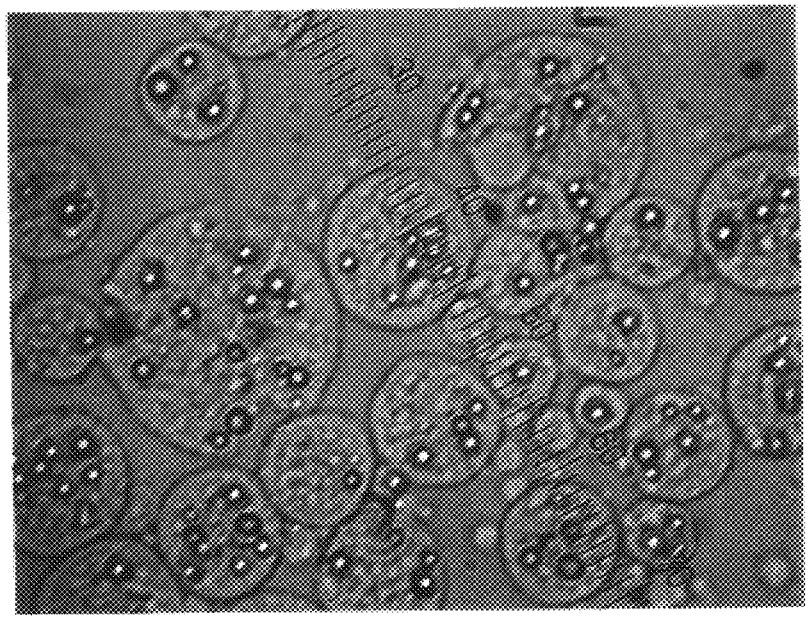
FIG. 1 is a an electron microscope (SEM) photograph showing a grain aggregate according to Example 9.

The following will explain one embodiment of the present invention. A grain aggregate according to the present embodiment has an arrangement in which a plurality of cross-linking polymeric grains are bonded together via a substance having a reactive functional group. Further, a producing method of the grain aggregate according to the present embodiment includes the step of drying by spraying a dispersion liquid including the cross-linking polymeric grains and a substance having the reactive functional group. More specifically, it is preferable to dry by spraying a blend liquid of the dispersion liquid containing the cross-linking polymeric grains and the substance having a reactive functional group.

The cross-linking polymeric grain refers to a grain which is obtained from a cross-linked polymer. Specifically, each of the cross-linking polymeric grains has an average particle size falling within a range of 0.01 μm to 1 μm. More specifically, the cross-linking polymeric grains are produced, for example, by emulsion-polymerization of a composition of vinyl-family monomers including a cross-linking monomer whose molecule has two or more polymeric vinyl groups.

The cross-linking monomer needs to be a monomer having two or more polymeric vinyl groups within a molecule. Specifically, examples of the cross-linking monomer include: a class of divinylbenzene; and multifunctional polymeric monomers including a class of ester (meth) acrylate which is polyhydric alcohol such as trimethylol-propane tri(meth)acrylate and (mono, di, tri, poly) ethyleneglycoldi(meth)acrylate, and the like, though not limited to these.

Further, the composition of vinyl-family monomers may include, in addition to the cross-linking monomer, a non-cross-linking monomer which may possibly be blended, and polymerization-react, with the cross-linking monomer. The non-cross-linking monomer needs to be a polymeric monomer having one polymeric vinyl group within a molecule. More specifically, examples of the non-cross-linking monomer include an aromatic vinyl compound such as styrene and α-methylstyrene; a class of ester (meth)acrylate such as (meth)acrylic acid, methyl (meth)acrylate, ethyl (meth) acrylate, and butyl (meth)acrylate; a class of vinyl ester such as vinyl acetate and vinyl propionate; a vinyl cyanide compound such as (meth)acrylonitrile; a vinyl halide compound such as vinyl chloride and vinylidene chloride; a class of conjugate diene such as butadiene; and the like, though not limited to these.

It is preferable that a ratio of a cross-linking monomer whose molecule has two or more polymeric vinyl groups, which is included in the composition of the vinyl-family monomer according to the present embodiment is set as high as possible so that the cross-linking polymeric grain obtains higher heat resistance, higher solvent resistance, and higher strength. However, when the ratio of the cross-linking monomer is excessively high, there may arise problems as follows: the obtained cross-linking polymeric grain becomes excessively hard, hence fragile; the obtained cross-linking polymeric grain is likely to gel during polymerization; and a flocculation tends to be formed. Further, the cross-linking monomer is expensive in common, and from the economic point of view it is not preferable to have a high ratio of the cross-linking monomer content. It should be noted that a high ratio of the cross-linking monomer content does not always offer desirable physical properties, and there exists the proper content range. Consequently, when using 100% by weight of the composition of the vinyl-family monomers, a ratio of the cross-linking monomer content included in the composition of the vinyl-family monomers more preferably falls in a range of 5% by weight to 30% by weight, and much more preferably falls in a range of 5% by weight to 20% by weight. When a ratio of the cross-linking monomer content is lower than 5% by weight, the heat resistance and the solvent resistance may be reduced. On the other hand, it is not economical when the ratio of the cross-linking monomer content exceeds 30% by weight, and besides, this may cause problems as above.

A producing method of a dispersion liquid including the cross-linking polymeric grains is not particularly limited, but emulsion-polymerization is the most preferable for the following reasons: cross-linking polymeric grains can be obtained most efficiently and stably; grains of a uniform shape can be obtained; and a manufacturing procedure is simple. Further, when adopting a spray-drying method for drying by spraying a dispersion liquid containing cross-linking polymeric grains as a method for obtaining a grain aggregate of cross-linking polymeric grains according to the present embodiment, it is more preferably to adopt a water dispersion liquid as the dispersion liquid. Accordingly, most preferable is the emulsion-polymerization capable of obtaining a water dispersion liquid containing cross-linking polymeric grains. The spray-drying method will be described later.

When performing emulsion-polymerization, a surface active agent is adopted as an emulsifier, and as an initiator is adopted an inorganic peroxide or redox-system initiator. Further, the cross-linking polymeric grain can be produced by emulsion-polymerization under the conditions such as a density of a solid component (a mixture of the vinyl-family monomers) being in a range of 5% by weight to 60% by weight, and a polymerization temperature being in a range of 20° C. to 100° C. It is more preferable that an average particle size ① of the cross-linking polymeric grain obtained by this emulsion-polymerization falls in a range of 0.01 μm to 1 μm. Note that, the average particle size of the cross-linking polymeric grain was measured by a light-scattering-type particle-size distribution meter.

In order to form a grain aggregate by the thus obtained cross-linking polymeric grains, for example, one method is the spray drying method for drying the cross-linking polymeric grains while causing fusion or bonding among the grains. This method is preferable because it is easy to control the particle size and shape of the grain aggregate. The spray drying method commonly refers to the method for drying grains by spraying a dispersing element (dispersion liquid) together with gas flow by means of a drier such as a spray drier and an airflow drier. As the dispersing element, a water dispersing element is preferable in terms of cost effectiveness and safety.

When performing the spray drying method, it is more preferable that the density of a solid component in a dispersion liquid falls in a range of 5% by weight to 60% by weight, and much more preferably in a range of 10% by weight to 50% by weight. As to a drying temperature, it is more preferable that a spray inlet temperature is in a range of 100° C. to 200° C., and an outlet temperature of powder (a grain aggregate) is in a range of 30° C. to 150° C. In addition, by appropriately controlling the density of a solid component, the supply velocity of a dispersion liquid, the drying temperature, and the like, it is possible to change a particle size, a particle shape, a bulk density, and the like. Therefore, conditions are not necessarily limited to the foregoing ones.

Note that, as a medium of the dispersion liquid, a water medium is convenient for the reason that a water dispersion liquid of cross-linking polymeric grains is obtained when adopting emulsion-polymerization in the production of a dispersion liquid of cross-linking polymeric grains. However, this is not particularly limited, and a different medium can also be adopted insofar as it does not adversely affect spray drying, the shape of the obtained grain aggregate, and the like. In addition, when adopting a medium other than the water medium, as a binder to be used which is a substance having a functional group may be adopted a solvent-soluble substance, for example, an epoxy resin dissolved in a solvent, and the like. Accordingly, the medium of the dispersion liquid is thus changeable as required.

The major feature of the present embodiment is to add a substance (binder) having a reactive functional group to a dispersion liquid including the cross-linking polymeric grains when performing the spray drying method. Thus adding the binder enables not only fusion among the cross-linking polymeric grains but also bonding of the grains through chemical bonding, thereby obtaining a grain aggregate having higher heat resistance and higher solvent resistance. Particularly, the foregoing spray drying is particularly preferable when obtaining a grain aggregate of a cross-linking polymeric grain which is obtained by polymerization of the composition of vinyl-family monomers adopting a large number of cross-linking monomers by which fusion and/or bonding hardly occurs among the grains and which has a higher glass-transition temperature. In addition, in the grain aggregate thus obtained by the foregoing spray drying method, the binder is of help to the grains in the bonding and may occasionally be the coat over the entire grain aggregate thus obtained. In that case, various properties of the grain aggregate (for example, the grain strength and light-diffusing properties) are further improved.

The foregoing binder refers to a substance having a reactive functional group which may possibly react with a mixture of the vinyl-family monomers which are the raw material of the cross-linking polymeric grain, or a functional group included in a surface active agent, an initiator, etc. More specifically, examples of the reactive functional group includes a hydroxyl group, a carboxyl group, an oxazoline group, an epoxy group, an aziridine group, an isocyanate group, and the like, though not particularly limited to these. The binder preferably has two or more reactive functional groups within a molecule, and a polymer having any of the foregoing reactive functional groups is preferably adopted.

More specifically, examples of the binder include: (i) a substance having a hydroxyl group such as polymers or saccharides including polyvinylalcohol or hydroxyethyl (meth)acrylate as a structural unit; (ii) a substance having the carboxyl group such as polymers including (meth)acrylic acid as a structural unit; (iii) a substance having the oxazoline group such as polymers including isopropenyl oxazoline as a structural unit; (iv) various polyatomic epoxy compounds or epoxy resins; (v) compounds or polymers having the aziridine group or isocyanate group, which are polymer materials, though not particularly limited to these. Among the foregoing examples, the binder including the epoxy group or oxazoline group is most preferable because of its high reactivity with a functional group in a cross-linking polymer. Further, when the dispersing element including the cross-linking polymeric grains according to the present embodiment is a water dispersing element, the preferable binder therefor is a water soluble or water dispersing binder. More specifically, preferable binders are, for example, a water-dispersing epoxy resin or water-dispersing oxazoline group-containing polymer, and a water-soluble epoxy resin or water-soluble oxazoline group-containing polymer. In addition, the binder is preferably a curable binder. More specifically, by using the curable binder for example, a hardened binder is provided among the grains when performing spray drying, thereby obtaining a more desirable grain aggregate. Thus, as a grain aggregate obtained in accordance with the present invention, a grain aggregate which is hardened by the binder is preferable.

Further, when blending the binder with a dispersion liquid including the cross-linking polymeric grains, a blend ratio of the binder to a solid component of the dispersion liquid is more preferably in a range of 2% by weight to 30% by weight, and much more preferably in a range of 5% by weight to 20% by weight. When the blend ratio is lower than 2% by weight, the grains may insufficiently be bonded together. On the other hand, when the blend ratio is higher than 30% by weight, there may be an impairment of an effect such that the binder forms a film over a surface of a grain aggregate so as to attain the grain aggregate having a large specific surface area.

Further, an average particle size ② of the grain aggregate according to the present embodiment more preferably falls in a range of 2 μm to 200 μm. The grain aggregate which falls off the range tends to reduce its effect depending on a use. An average particle size of the grain aggregate can be measured by a multisizer, and the like.

Further, it is most preferable that a cross-linking polymeric grain which forms the grain aggregate according to the present embodiment has the average particle size ① of the cross-linking polymeric grain falling in a range of 0.01 μm to 1 μm, and the average particle size ② of the grain aggregate falling in a range of 2 μm to 200 μm.

The grain aggregate according to the present embodiment is an aggregate in which a plurality of cross-linking polymeric grains are bonded together through the binder, where each cross-linking polymeric grain maintains an individual shape. Therefore, the grain aggregate has characteristics that are a large specific surface area and a small bulk density. The grain aggregate has further characteristics that are higher heat resistance, higher solvent resistance, and higher strength than those of a conventional grain aggregate.

Further, in the present invention, in the case where the grain is a cross-linking polymeric grain made of an organic substance, it is more preferable to adopt as the obtained grain aggregate a cross-linking polymeric grain having low solvent solubility so as to attain desired physical properties, and more preferably adopted is a cross-linking polymeric grain having virtually no solvent solubility. For example, a grain which is recited in a Second Embodiment below is made of an inorganic substance and, naturally, has no solvent solubility. The solubility with respect to toluene may be an indicator of the solvent solubility of the grain according to the present invention. More specifically, after adding 10 g of the cross-linking polymeric grains to 100 g of toluene at 25° and blending them by agitation for 24 hours, the solubility of the cross-linking polymeric grains with respect to toluene is more preferably not more than 5%, and much more preferably not more than 3%, and most preferably not more than 1%. Since cross-linking monomers are used to form the cross-linking polymeric grains according to the present invention, solvent resistance thereof is desirable. The solubility above indicates a quantity of the cross-linking polymeric grains reduced after blending agitation, where a quantity of the cross-linking polymeric grains before blending agitation is 100% by weight. This becomes an index showing how much the cross-linking polymeric grains dissolve in a solvent, or in other words, to what extent the grains are cross-linked. Note that, in the present invention, a grain which satisfies this index is regarded as a cross-linking polymeric grain which virtually has no solvent solubility.

[Second Embodiment]

The following will explain another embodiment of the present invention. The grain aggregate according to the present embodiment has an arrangement in which a plurality of grains of at least two different types are bonded together. In addition, a producing method of the grain aggregate according to the present embodiment includes the step of drying by spraying a dispersion liquid including the plurality of grains of at least two different types. Further, a light-diffusing agent according to the present embodiment includes the grain aggregate having an arrangement in which the plurality of grains of at least two different types are bonded together. Note that, for ease of explanation, explanation of the same arrangements as with the First Embodiment above will be omitted here.

The material to form the foregoing grain is not particularly limited, and either an organic material or an inorganic material may be adopted. Grains made of an organic substance includes, for example, a cross-linking polymeric grain, and specific examples of which include a vinyl-family cross-linking polymer obtained by polymerizing a mixture of a cross-linking monomer such as divinylbenzene, trimethylolpropane tri(meth)acrylate and di(meth)acrylate of an ethyleneglycol class, and a non-cross-linking monomer such as styrene and alkylester (meth)acrylate. In addition, more preferable is a cross-linking resin grain made of, for example, amino-family formalin cross-linking resin which is a condensation of an amino compound such as melamine and benzoguanamine, and formaldehyde. Further, as a grain made of an organic substance according to the present invention can also be adopted a grain having a thermal decomposition initiating temperature of not less than 170° C., which is used in high-heat-resistance plastic such as polyamide or polyimide.

Among the foregoing, the most preferable as the grain made of an organic substance are the cross-linking polymeric grains and/or cross-linking resin grains.

Examples of the inorganic material, though not particularly limited, include inorganic oxides such as silica, titania, zirconia, and alumina, and calcium carbonate, aluminum hydroxide, and glass grains. Of these examples of the inorganic materials, more preferable is an inorganic oxide, and most preferable is a silica-family oxide.

Note that, from the practical point of view, it is preferable that the grain aggregate thus obtained has high heat resistance and high solvent resistance. Therefore, a thermal decomposition initiating temperature of all the grains used in the grain aggregate is more preferably in a range of not less than 170° C. The thermal decomposition initiating temperature refers to the one measured under a nitric atmosphere in a differential thermal analysis. In the measurement of the thermal decomposition initiating temperature, as measurement equipment is adopted a TG-DTA (manufactured by MAC SCIENCE; model No. 2000S), so as to measure a thermal decomposition initiating temperature of a grain aggregate obtained under conditions such as a rising temperature of 10° C./min., and a nitrogen supply quantity of 20 ml/min. Thereafter, a thermal decomposition initiating temperature is calculated from a peak at which thermal decomposition occurs. Note that, the TG-DTA is capable of measuring a thermal decomposition initiating temperature of up to 500° C.

As a preferable thermal decomposition initiating temperature of the grain made of an organic substance is either not less than 190° C., not less than 200° C., not less than 210° C., or not less than 230° C., and more preferably not less than 250° C., and most preferably not less than 280° C. The grain made of an organic substance is more preferably a cross-linking polymeric grain. When the thermal decomposition initiating temperature of the grains is not less than either of the foregoing temperatures, the obtained grain aggregate has the improved heat resistance and solvent resistance. By controlling a quantity or type of the cross-linking polymeric grains, and a molecular weight of the obtained grain aggregate, a thermal decomposition initiating temperature can be made not less than either of the foregoing temperatures. In addition, the thermal decomposition initiating temperature of the grains made of an inorganic substance is not less than 1,000° C., that is, not less than the measurement range measured by the measurement equipment of a thermal decomposition initiating temperature according to the present embodiment.

Further, in the present embodiment, a grain aggregate is formed of the grains and the binder. Therefore, a thermal decomposition initiating temperature of the obtained grain aggregate basically shows a value which is slightly lower than a thermal decomposition initiating temperature of the grains to be used. In the present embodiment, by selecting an addition quantity and a type of the binder, a thermal decomposition initiating temperature becomes preferably not less than 180° C., and more preferably not less than 200° C., and much more preferably not less than 220° C., and most preferably not less than 260° C. Particularly, it is preferable, in order to attain desirable heat resistance for a grain aggregate, that the grain aggregate according to the present invention adopts grains to form the grain aggregate which have a thermal decomposition initiating temperature of not less than 250° C., and a grain aggregate to be obtained using the binder has a thermal decomposition initiating temperature of not less than 220° C. It is more preferable to adopt grains having a thermal decomposition initiating temperature of not less than 280° C. so that a thermal decomposition initiating temperature of the grain aggregate becomes not less than 260° C.

Further, a producing method of a grain made of any of the foregoing materials is not particularly limited, and a conventional, known method may be adopted. It is more preferable that an average particle size ① of the grain thus obtained falls in a range of 0.01 µm to 5 µm.

The grain aggregate according to the present embodiment is an aggregate of at least two different types of grains, materials of which are respectively selected from the foregoing materials. In that case, a difference in refractive index between the different types of grains is more preferably not less than 0.02, and most preferably not less than 0.03. When the difference in refractive index between the different types of grains is not less than 0.02, a light-diffusing power of the grain aggregate thus obtained is made more superior. In addition, the grains to be selected may be selected either from the same material group or from different material groups. For example, a combination of vinyl-family cross-linking polymeric grains obtained by polymerization of differently composed polymeric monomers may be selected. More specifically, as the combination of the vinyl-family cross-linking polymeric grains may be selected the two different types of grains that are a grain of a vinyl-family cross-linking polymer having styrene as its structural unit, and a grain of a vinyl-family cross-linking polymer having methyl methacrylate as its structural unit. Alternatively, a combination of vinyl-family cross-linking polymeric grains respectively using different amounts of cross-linking monomers may be selected. Further, for example, there may be selected a combination of a vinyl-family cross-linking polymeric grain having styrene as its structural unit and/or a vinyl-family cross-linking polymeric grain having methyl methacrylate as its structural unit, and a silica grain which is an inorganic material. Various types of grains as above may be adopted in combination as required in accordance with physical properties desired by the obtained grain aggregate.

Further, the grains to be selected are set to have an equivalent average particle size ①, or more specifically, an average particle size of each grain to be used is controlled to fall in a certain range, thereby uniforming the particle sizes of the grain aggregates to be obtained. Here, the "equivalent" particle size means that an average particle size of the larger of the two grains is adjusted to be more preferably not more than three times the average particle size of the smaller of the two grains, and much more preferably not more than twice the average particle size of the smaller of the two grains. In the case where the average particle size of the larger of the two grains is larger than three times the average particle size of the smaller of the two grains, a grain aggregate of grains of only a single material may be included, or a blend ratio of two different types of grains may not be reflected by a ratio of materials of the grain aggregates to be obtained. Note that, when adopting grains of three or more different types, the a ratio of the average particle size of the minimum-size grain to the average particle size of the maximum-size grain is required to fall in the foregoing range.

Note that, a blend ratio of two or more different types of grains is not particularly limited. However, in view of the performance of a grain aggregate, the blend ratio of two or more different types of grains with respect to the total weight of grains using a minimum of the ratio of the grains is preferably not less than 3% by weight, and more preferably not less than 5% by weight.

A producing method of the grain aggregate is preferably a spray drying method. In the present embodiment, in order to produce a grain aggregate, the same control as that of the spray drying method according to the First Embodiment may be performed, except that two or more different types of grains are supplied to a drier. Namely, a binder which is a substance having a reactive functional group may be used together in the spray drying, as required.

In addition, in order to supply grains to a drier, it is more preferable that the grains are supplied using a solvent as a dispersion liquid. In that case, the solvent to be adopted is not particularly limited, and a solvent used in producing grains may be adopted as it is, or this may be replaced with a preferable solvent. In view of stability of the grain aggregate thus formed as well as cost effectiveness and safety, water is more preferably adopted as the solvent for use in the spray drying method. Further, in the present embodiment, it is more preferable that the grains are supplied to the drier in a state of a water dispersing element or emulsion. When adopting a cross-linking polymeric grain as the grain, it is preferable that the water-dispersing element or emulsion is obtained by emulsion polymerization. Alternatively, a cross-linking polymeric grain which is polymerized with a solvent other than water may be adopted as required.

When adopting two or more different types of grains, a blending method of the grains is not particularly limited. More specifically, examples of the method include: a method for providing a drier with a dispersion liquid in which two or more different types of grains have previously been blended; a method for blending the separately provided dispersion liquids which respectively include different grains, either inside the drier or inside a pipe located immediately before the drier; and a method for blending dispersion liquids which respectively include different grains when drying by separately providing the dispersion liquids to different supply ports located inside of either different nozzles or the same nozzle in a drier, though not particularly limited to these methods.

Further, various methods as above may also be adopted in the blending method of the binder that is a substance having a reactive functional group and the dispersion liquid containing the cross-linking polymeric grains as adopted in the First Embodiment. Examples of such methods include: a method for supplying a drier with a binder and a dispersion liquid of cross-linking polymeric grains, which have been blended in advance; a method for blending a binder and a dispersion liquid of cross-linking polymeric grains in either a drier or a pipe located immediately before a drier by separately supplying them; and a method for blending a dispersion liquid of cross-linking polymeric grains and a binder when drying by separately supplying them to different nozzles or different supply ports in a single nozzle, though not particularly limited to these. Among there examples of methods, it is most preferable to adopt the method for supplying a drier with the binder and the dispersion liquid of cross-linking polymeric grains, which have been blended in advance. By adopting this method, a grain aggregate having a stable shape of a grain can be attained, thereby attaining a uniform grain aggregate having more superior heat resistance and solvent resistance, and particularly superior light-diffusing properties.

The grain aggregate according to the present embodiment is an aggregate in which two or more different types of grains are bonded together, where each grain maintains an individual shape. Therefore, the grain aggregate has characteristics that are a spherical shape, a sharp grain-size distribution, a large specific surface area, and a small bulk density. In addition, the grain aggregate has further characteristics that are higher heat resistance, higher solvent resistance, higher strength, and higher light-diffusing power than those of a conventional grain aggregate.

Note that, an average particle size ②  of the grain aggregate is more preferably in a range of 5 to 50 times the average particle size ① of an adopted grain, and much more preferably in a range of 10 to 40 times the average particle size ① of an adopted grain. When off these ranges, the size of a specific surface area of the grain aggregate may become small, or the height of irregularities on a surface of the grain aggregate may become low.

Further, it is most preferable that the grain aggregate according to the present embodiment has the average particle size ① of the grain to be used as a raw material falling in a range of 0.01 μm to 5 μm, and the average particle size ② of the grain aggregate falling in a range of 5 to 50 times the average particle size ① of the grain.

Further, the grain aggregate made up of two or more different types of grains which are respectively made of different organic substances is capable of further reducing a weight per grain aggregate, thereby attaining more superior light-diffusing power per unit weight.

Further, the grain aggregate adopting grains made of inorganic substances has more superior heat resistance and solvent resistance, that is preferably be applicable to any uses requiring the properties described above.

Further, the grain aggregate adopting a grain made of an inorganic substance and a grain made of an organic substance has characteristics of the both grains. Accordingly, because of its high affinity for an organic material, the grain aggregate is preferably used in combination with the organic material in various uses.

Further, when performing spray-drying, a binder which is a substance having a reactive functional group may be added to dispersion liquids of at least two different types of grains. By thus adding the binder, a grain aggregate having further improved heat resistance, solvent resistance and strength can be obtained. Particularly, when adopting an inorganic material such as silica to form grains, fusion or bonding among the grains may be insufficient, and therefore it is more preferable to add the binder. In addition, an addition quantity of the binder with respect to the grain is more preferably in a range of 0.1% by weight to 20% by weight, provided a solid component of the binder is measured. By thus having the binder in this range, solvent resistance of the obtained grain aggregate cay be greatly improved.

Further, as to the shape of a nozzle of a drier when adopting the spray-drying method, a nozzle capable of blending a binder and a dispersion liquid of cross-linking polymeric grains in a part of the nozzle may be used as described above, though not particularly limited.

A light-diffusing agent including the grain aggregate according to the First and Second Embodiments may be used by blending with a molding-use resin, a coating material, an adhesive, a coating-use resin, and the like. Further, there is no problem in using the light-diffusing agent including the foregoing grain aggregate and a conventional, known light-diffusing agent in combination; in that case, a quantity of the grain aggregate is more preferably not less than 10% by weight of the total quantity of the light-diffusing agents, and most preferably not less than 20% by weight of the total quantity of the light-diffusing agents.

Further, the light-diffusing agent according to the present embodiment has superior light-diffusing power per grain aggregate and is light in weight, thereby requiring a smaller amount of the light-diffusing agent in blending than a conventional light-diffusing agent so as to be highly effective, thus attaining a superior distribution of brightness and high light transmissivity. Furthermore, since grains having different refraction indexes are bonded to form a grain aggregate, the grain aggregate of the present embodiment has superior light-diffusing properties compared to a grain aggregate formed of grains of a single type.

A light-diffusing mold article is a mold article adopting the light-diffusing agent. More specifically, examples of a producing method of the light-diffusing mold article include: (i) a method for coating a surface of a transparent base material such as a film or panel with the light-diffusing agent; (ii) a method for molding a mixture of the light-diffusing agent and a molding-use resin such as an epoxy resin or polyester resin into a shape corresponding to each of various uses; and others, though not particularly limited to these.

In the foregoing method (i), more specifically, materials of the film used as the transparent base material include polyethylene terephthalate, polycarbonate, polystyrene, polyethylene, polypropylene and the like, though not particularly limited to these. In addition, particularly, polyethylene terephthalate is desirably used because of its low cost and high degree of transparency. Further, more specifically, materials of the transparent panel used as the transparent base material include glass, a polyester resin a polycarbonate resin, a polymethyl methacrylate resin and others, though not particularly limited to these. Note that, the light-diffusing mold article is not limited to a mold article having a plan structure such as a film and a panel, and a mold article having a three-dimensional structure such as an LCD (liquid crystal) panel, an LED light emitting device, a fluorescent light emitting device and the like may be adopted instead.

In the foregoing method (i), when applying a coating of the light-diffusing agent, normally, a dispersion-use resin dissolved in a diluent of an organic solvent is blended with the light-diffusing agent. Examples of the dispersion-use resin include acrylic resin, polyester resin, polyvinyl chloride, polyurethane, silicone resin and others, and those having optical transparent properties are desirably adopted. The polyester resin is PET having a modified structure, hence a modified polyester resin having solvent solubility.

Examples of the organic solvent include toluene, xylene, methyl ethyl ketone, cyclohexane, a class of ester acetate, and others, though not particularly limited to these. A ratio of the light-diffusing agent, the dispersion-use resin, and the organic solvent is not particularly limited; however, for example, it is desirable that the dispersion-use resin falls in a range of 50 parts by weight to 300 parts by weight, and the organic solvent falls in a range of 50 parts by weight to 300 parts by weight, where the light-diffusing agent is 100 parts by weight, thereby obtaining a coating-use composition. In addition, it is also possible to blend a cross-linking agent for crosslinking the dispersion-use resin, a charge prevention agent, a dispersion agent for dispersing the light-diffusing agent, and the like with the coating-use composition.

Further, in the foregoing method (i), more specifically, examples of the method for coating the surface of a transparent substrate with the coating-use composition include: comma direct coating, spin coating, spray coating, roll coating, dipping, knife coating, curtain flow coating, laminating, and others, though not particularly limited to these.

Note that, it is preferable that a layer thickness of the light-diffusing agent when applying the coating-use composition to the surface of a film having transparent properties falls in a range of 5 μm to 100 μm.

When adopting a light-diffusing film (light-diffusing mold article) including the light-diffusing agent according to the present embodiment to, for example, a backlight and the like of a liquid crystal display device, high brightness and a wide angle of visibility can be attained.

[Third Embodiment]

The following will explain yet another embodiment of the present invention. A light-diffusing agent according to the present embodiment includes a grain aggregate in which a plurality of cross-linking polymeric grains are bonded together. Further, a light-diffusing mold article according to the present embodiment includes a use of the light-diffusing agent. Note that, for ease of explanation, explanation of the same arrangement as with the First or Second Embodiment above will be omitted.

The cross-linking polymeric grain is not particularly limited in terms of composition and a producing method, insofar as it is a grain including a cross-linking polymer. For example, this can be produced by emulsion-polymerization of a mixture of vinyl-family monomers including a cross-linking monomer by a conventional, known method.

It is more preferable that the cross-linking monomer included in the mixture of the vinyl-family monomers has as higher a ratio as possible because, in that case, the cross-linking polymeric grain thus obtained has higher heat resistance, higher solvent resistance and higher strength. However, an extremely high ratio of the cross-linking monomer almost prevents fusion or bonding among the cross-linking polymeric grains, thereby making it difficult to form a grain aggregate.

Accordingly, when, for example, adopting divinylbenzene as the cross-linking monomer, a ratio of divinylbenzene included in the mixture of the vinyl-family monomers is more preferably in a range of 2% by weight to 10% by weight, and much more preferably in a range of 3% by weight to 8% by weight.

Further, when, for example, adopting trimethylolpropane tri(meth)acrylate as the cross-linking monomer, a ratio of trimethylolpropane tri(meth)acrylate included in the mixture of the vinyl-family monomers is more preferably in a range of 5% by weight to 30% by weight, and much more preferably in a range of 8% by weight to 20% by weight.

An example of a method for forming a grain aggregate of the obtained cross-linking polymeric grains is a method for drying the cross-linking polymeric grains while causing fusion or bonding among the grains by a spray drying method, though not particularly limited to this. The spray drying method is preferable because of an easy control of the particle size and the shape of the grain aggregate.

The grain aggregate thus obtained by the spray drying method is an aggregate of the plurality of cross-linking polymeric grains bonding together. Accordingly, the grain aggregate has characteristics that are a spherical shape, a sharp grain-size distribution, a large specific surface area, and a small bulk density.

Further, an average particle size ② of the grain aggregate thus obtained by the spray drying method is more preferably in a range of 2 μm to 50 μm, and much more preferably in a range of 5 μm to 20 μm. The light-diffusing power may insufficiently be attained when the average particle size ② of the grain aggregate is smaller than 2 μm. On the other hand, light transmissivity may be reduced when the average particle size ② of the grain aggregate is larger than 50 μm. An average particle size of the grain aggregate can be measured by a multisizer and the like.

Note that, when performing spray drying, a binder may be added to a dispersion liquid of the cross-linking polymeric grains as required. By thus adding the binder, a grain aggregate having the improved heat resistance, solvent resistance and strength can be attained. An addition quantity of the binder is more preferably in a range of 0.1% by weight to 10% by weight with respect to the cross-linking polymeric grains, where a solid component of the binder is measured. By thus adding the binder within this range, solvent resistance of the obtained grain aggregate can be greatly improved. As the binder can be adopted a binder given as an example in the First Embodiment.

Further, as explained in the First and Second Embodiment, various methods can be adopted as the method for blending a binder and the cross-linking polymeric grains. Even in the Third Embodiment, as discussed, by the spray drying of a dispersion liquid containing cross-linking polymeric grains and a binder, it is possible to more firmly cause fusion or bonding among the cross-linking polymeric grains via the binder in-between. Further, in the present invention, it is possible to obtain a grain aggregate in a state that at least a part of the obtained grain aggregate is coated with the binder. It is more preferable to thus form a grain aggregate using a binder because of improvement in heat resistance and solvent resistance of the grain aggregate.

The light-diffusing agent according to the present embodiment can be used by blending it with a molding-use resin, a coating material, an adhesive, a coating-use resin and the like. Further, there is no problem when using the light-diffusing agent including the grain aggregate and a conventional, known light-diffusing agent in combination. In that case, it is more preferable is to contain the grain aggregate of not less than 10% by weight in the total amount of the light-diffusing agent, and it is much more preferable to contain the grain aggregate of not less than 20% a by weight in the total amount of the light-diffusing agent.

Further, the light-diffusing agent according to the present embodiment has superior light-diffusing power per grain aggregate and is light in weight, thereby being highly effective by a smaller amount of blend than a conventional light-diffusing agent, thus attaining a superior distribution of brightness and high light transmissivity.

The light-diffusing mold article according to the present embodiment is a mold article including the use of the light-diffusing agent. When, for example, applying the light-diffusing mold article to a backlight and the like of a liquid crystal display, high brightness and a wide angle of visibility can be attained.

EXAMPLE

The following will explain the present invention in detail with reference to Examples and Comparative Examples. However, the present invention is not limited to these Examples and the Comparative Examples. Note that, an average particle size of a grain to be used or a cross-linking polymeric grain was measured in a state of a dispersion liquid by a light-diffusing-type particle-size distribution meter (Model_370; manufactured by Nicomp). Further, after performing spray-drying, an average particle diameter (average particle size) of the obtained grain aggregate was measured by a multisizer (Multisizer II; manufactured by Coulter).

Production Example-1

In a 2 L separable flask having an agitator, a thermometer and a reflux condenser attached thereto, 43 g of pure water and 0.9 g of Hitenol N08 (produced by Daiichi Kogyo Seiyaku K. K.; an anion surface-active agent) were prepared, a temperature of which was increased to 70° C. under agitation while performing nitrogen substitution. After reaching the temperature of 70° C., 57 g of methylmethacrylate was added, and 5 minutes later then, 70 g of a 2% by weight solution of potassium peroxide was added.

Next, a pre-emulsion (608 g of methylmethacrylate, 35 g of divinylbenzene, 752 g of pure water, and 34 g of Hitenol N08) which had been prepared beforehand was added at 70° C. with constant velocity in four hours, starting at 20 minutes after the addition of potassium peroxide. After finishing the addition, a temperature was increased to 75° C., then maturation was carried out for two hours. Thereafter, a temperature was cooled to 40° C., thereby obtaining a dispersion liquid (1) including the cross-linking polymeric grains (PMMA-family cross-linking polymeric grains). An average particle size ① of the cross-linking polymeric grain was measured by a light-scattering-type particle-size distribution meter, and a result of which was 0.2 µm.

Note that, a thermal decomposition initiating temperature of powder obtained by drying the dispersion liquid was 290° C., and a refractive index was 1.51.

Production Example-2

In a 2 L separable flask having an agitator, a thermometer and a reflux condenser attached thereto, 43 g of pure water and 0.9 g of Hitenol N08 were prepared, a temperature of which was increased to 70° C. under agitation while performing nitrogen substitution. After reaching the temperature of 70° C., 100 g of a pre-emulsion (608 g of styrene, 35 g of divinylbenzene, 752 g of pure water, and 34 g of Hitenol N08, a subtotal of which is 1,429 g) which had been prepared beforehand was added, and 5 minutes later than, 70 g of a 2% by weight solution of potassium peroxide was added.

Next, the rest of the pre-emulsion was added at 70° C. with constant velocity in four hours, starting at 20 minutes after the addition of potassium peroxide. After finishing the addition, a temperature was increased to 80° C., then maturation was carried out for two hours. Thereafter, the temperature was cooled to 40° C., thereby obtaining a dispersion liquid (2) including the cross-linking polymeric grains (styrene-family cross-linking polymeric grains). An average particle size ① of the cross-linking polymeric grain was measured by a light-scattering-type particle-size distribution meter, and a result of which was 0.3 µm.

Note that, a thermal decomposition initiating temperature of powder obtained by drying the dispersion liquid was 300° C., and a refractive index was 1.58. In addition, the solubility of the cross-linking polymeric grains was measured by the method recited in the First Embodiment, and the resultant solubility was 0.5%.

Example 1

A blended dispersion liquid was obtained by blending the dispersion liquid (1) containing the PMMA-family cross-linking polymeric grains and the dispersion liquid (2) containing the styrene-family cross-linking polymeric grains at a ratio of 10:90, where solid-components were measured. Further, 10% by weight (a solid component only) of oxazoline-group-containing polymer (produced by Nippon Shokubai Co., Ltd., Epocross K2020E) was added to a solid component of the blended dispersion liquid, thereby obtaining a blend liquid. The blend liquid is dried by a spray drier manufactured by Yamato Scientific Co., Ltd., under conditions shown below so as to obtain powder (A) which is a grain aggregate having the structure of the present application. The conditions are as follows:

supply velocity: 5 ml/min
spray pressure: 2 kg/cm²
gas volume: 0.3 m³/min
inlet temperature: 150° C.
outlet temperature: 600° C.

The powder (A) thus obtained was measured by the multisizer, and the measured average particle size ② was 9 µm. Further, according to observation through a microscope (SEM), the powder (A) was made up of a grain aggregate in which the cross-linking polymeric grains bonded together while maintaining an individual shape of each of the cross-linking polymeric grains. In addition the powder (A) had the thermal decomposition initiating temperature of 270° C.

Example 2

Powder (B) which is a grain aggregate having the structure of the present application was obtained by repeating the same operation as with Example 1, except that in lieu of the dispersion liquid (2) containing the styrene-family cross-linking polymeric grains was adopted a blend liquid in which melamine cross-linking resin grains (produced by Nippon Shokubai Co., Ltd., Epostar S, an average particle size is 0.3 µm, a refractive index is 1.59) were dispersed in water using anion surface-active agent so that a solid component became 30% by weight.

The powder (B) thus obtained was measured by the multisizer, and the measured average particle size ② as a grain aggregate was 8 µm. Further, according to observation through a microscope (SEM), the powder (B) was made up of a grain aggregate in which the cross-linking polymeric grains bonded together while maintaining an individual shape of each of the cross-linking polymeric grains. In addition, the powder (B) had the thermal decomposition initiating temperature of 300° C.

Example 3

Powder (C) which is a grain aggregate having the structure of the present application was obtained by repeating the same operation as with Example 1, except that in lieu of the dispersion liquid (2) containing the styrene-family cross-linking polymeric grains was adopted a water dispersion body of silica grains (produced by Nippon Shokubai Co., Ltd., Seahostar KE-W30, an average particle size is 0.3 µm, a refractive index is 1.60).

The powder (C) thus obtained was measured by the multisizer, and the measured average particle size ② as a grain aggregate was 8 µm. Further, according to observation through the SEM, the powder (C) was made up of a grain aggregate in which the cross-linking polymeric grains bonded together while maintaining an individual shape of each of the cross-linking polymeric grains. In addition, the powder (C) had the thermal decomposition initiating temperature of not less than 1,000° C.

Example 4

Powder (D) which is a grain aggregate having the structure of the present application was obtained by repeating the same operation as with Example 1, except that in lieu of the dispersion liquid (2) containing the styrene-family cross-linking polymeric grains was adopted a blended dispersion liquid in which benzoguanamine-melamine resin grains (produced by Nippon Shokubai Co., Ltd., Epostar M30, an average particle size is 3 µm, a refractive index is 1.59) were added so that a solid component became 20% by weight, to which the oxazoline group-containing polymer (same as above) was further added so that a solid component became 25% by weight.

The powder (D) thus obtained was measured by the multisizer, and the measured average particle size ② as a grain aggregate was 11.3 μm. Further, according to observation through the SEM, the powder(D) was made up of a grain aggregate in which the cross-linking polymeric grains bonded together while maintaining an individual shape of each of the cross-linking polymeric grains. In addition, the powder (D) had the thermal decomposition initiating temperature of not less than 300° C.

Example 5

Powder (E) which is a grain aggregate having the structure of the present application was obtained by repeating the same operation as with Example 1, except that in lieu of the dispersion liquid (2) containing the styrene-family cross-linking polymeric grains was adopted a blended dispersion liquid in which benzoguanamine resin grains (produced by Nippon Shokubai Co., Ltd., Epostar L15, an average particle size is 10 μm, a refractive index is 1.59) were added so that a solid component became 50% by weight, to which the oxazoline group-containing polymer (same as above) was further added so that a solid component became 25% by weight.

The powder (E) thus obtained was measured by the multisizer, and the measured average particle size ② as a grain aggregate was 13.1 μm. Further, according to observation through the SEM, the powder (E) was made up of a grain aggregate in which the cross-linking polymeric grains bonded together while maintaining an individual shape of each of the cross-linking polymeric grains. In addition, the powder (E) had the thermal decomposition initiating temperature of not less than 300° C.

Comparative Example 1

The present comparative example corresponds to Examples 1 to 5 and is not a comparative example according to the present invention.

Comparison-use Powder (F) was obtained by repeating the same operation as with EXAMPLE 1, except that in lieu of the dispersion liquid (1) containing the cross-linking polymeric grains was adopted only the dispersion liquid (2) containing the cross-linking polymeric grains. Accordingly, the comparison-use powder (F) was made up of a grain aggregate of a single type alone.

The comparison-use powder (F) was measured by the multisizer, and the measured average particle size was 11 μm.

Example 6

As a dispersion-use resin was adopted 100 g of polyester resin (produced by Toyobo Co., Ltd., Vylon 200), while adopting as a dilution-use organic solvent 120 g of toluene and 30 g of methyl ethyl ketone, with which 20 g of the powder (A) obtained in Example 1 was blended, thereby obtaining a coating-use composition.

As a base material film was adopted a polyester film (produced by Toray Industries, Inc., Lumirror #100T56) having a film thickness of 100 μm, and one side of the film was coated with the coating-use composition by roll coating. This was dried for one minute by hot air drying at 120° C. so as to form a light-diffusing layer having a film thickness of 30 μm, thereby obtaining a film (10).

Example 7

A film (11) was obtained by repeating the same operation as with Example 6, except that the powder (A) was replaced with the powder (B).

Example 8

A film (12) was obtained by repeating the same operation as with Example 6, except that the powder (A) were replaced with the powder (C).

Example 9

Figure 2:
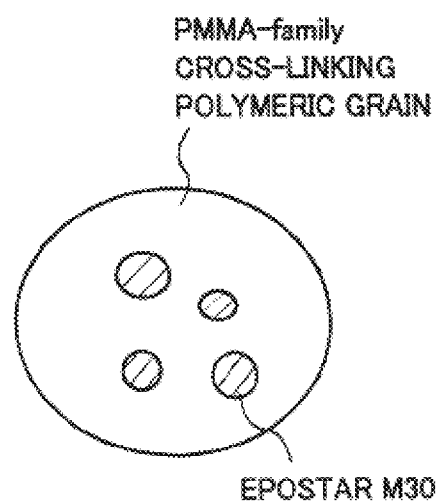
FIG. 2 is a schematic view of a structure of the grain aggregate of the Example 9.

A film (13) was obtained by repeating the same operation as with Example 6, except that the powder (A) were replaced with the powder (D). Further, according to observation through the SEM, as shown in FIG. 2, the film (13) was made up of a grain aggregate in which the cross-linking polymeric grains bonded together while maintaining an individual shape of the cross-linking polymeric grains. FIG. 1 shows a microphotograph of the grain aggregate.

Example 10

Figure 3:
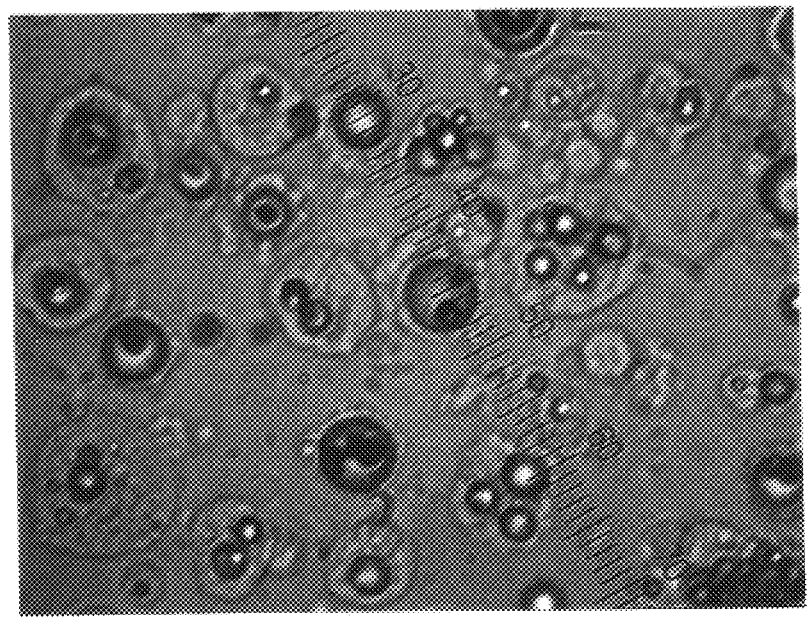
FIG. 3 is an SEM photograph showing a grain aggregate according to Example 10.
Figure 4:
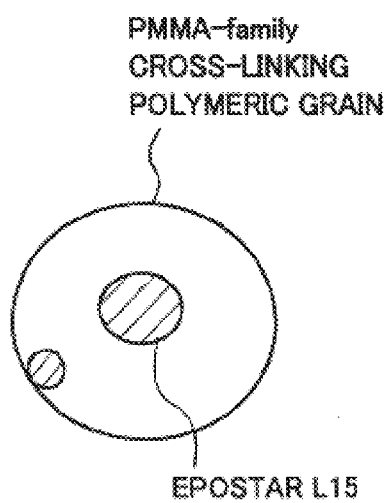
FIG. 4 is a schematic view showing a structure of the grain aggregate of Example 10.

A film (14) was obtained by repeating the same operation as with Example 6, except that the powder (A) was replaced with the powder (E). Further, according to observation through the SEM, as shown in FIG. 4, the film (14) was made up of a grain aggregate in which the cross-linking polymeric grains bonded together while maintaining an individual shape of each of the cross-linking polymeric grains. FIG. 3 shows a microphotograph of the grain aggregate.

Comparative Example 2

The present comparative example corresponds to Examples 6 to 10 and is not a comparative example according to the present invention.

A comparison-use film (15) was obtained by repeating the same operation as with Example 6, except that the powder (A) was replaced with the comparison-use powder (F).

Comparative Example 3

The present comparative example corresponds to Examples 6 to 10 and is not a comparative example according to the present invention.

Figure 5:
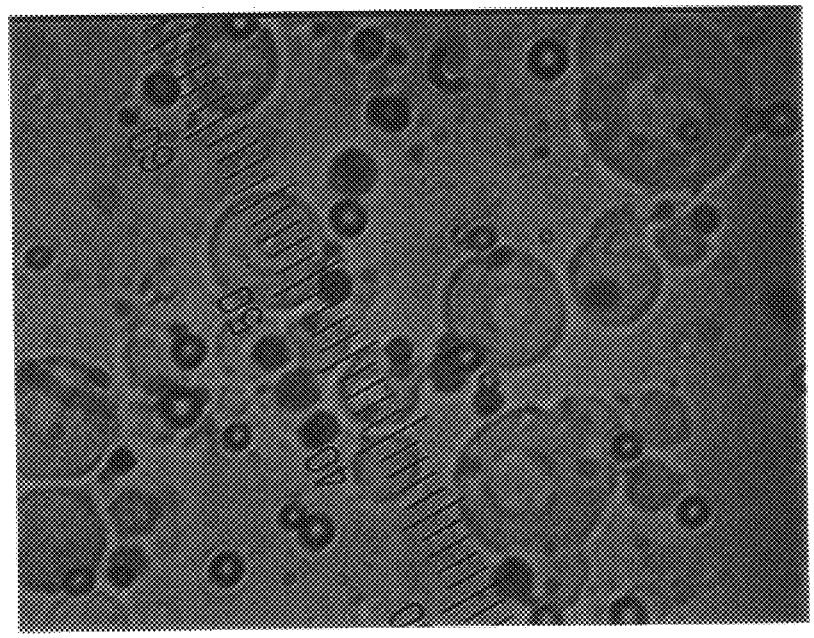
FIG. 5 is an SEM photograph showing a blend of grains according to Comparative Example 3.
Figure 6:
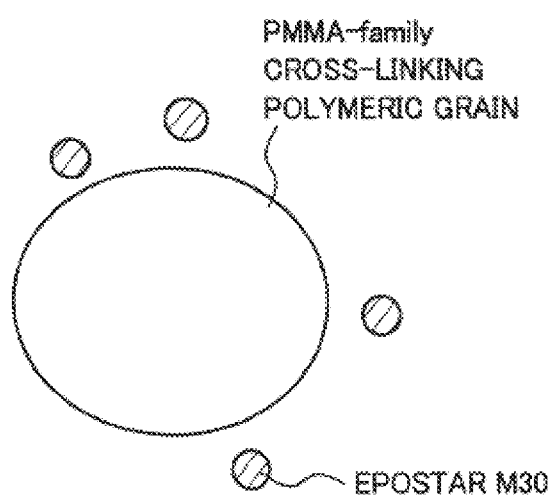
FIG. 6 is a schematic view showing a structure of the blend of grains of Comparative Example 3.

A comparison-use film (16) was obtained by repeating the same operation as with Example 6, except that the powder (A) was replaced with a blend of the powder (D) and benzoguanamine-melamine resin grains (produced by Nippon Shokubai Co., Ltd., Epostar M30, an average particle size is 3 μm, a refractive index is 1.59) which were blended at a weight ratio of 4:1. Further, according to observation through the SEM, as shown in FIG. 6, the comparison-use film (16) was a blend of grains in which styrene-family cross-linking polymeric grains (powder (D)) and benzoguanamine-melamine resin grains were blended. FIG. 5 shows a microphotograph of the blend of grains.

Comparative Example 4

The present comparative example corresponds to Examples 6 to 10 and is not a comparative example according to the present invention.

Figure 7:
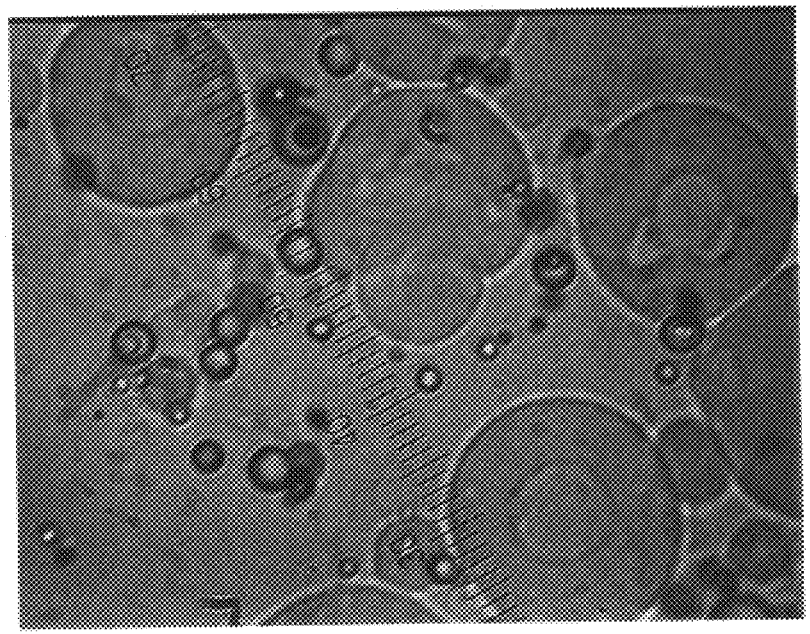
FIG. 7 is an SEM photograph showing a blend of grains according to Comparative Example 4.
Figure 8:
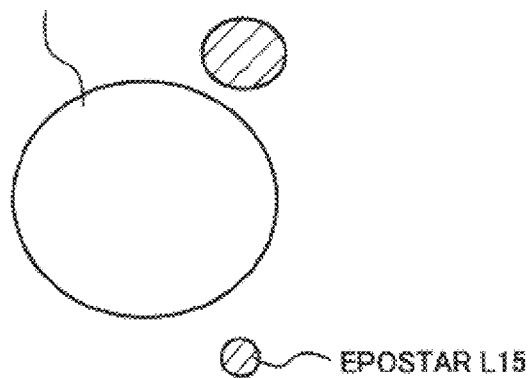
FIG. 8 is a schematic view showing a structure of the blend of grains of Comparative Example 4.

A comparison-use film (17) was obtained by repeating the same operation as with Example 6, except that the powder (A) were replaced with a blend of the powder (E) and benzoguanamine grains (produced by Nippon Shokubai Co., Ltd., Epostar L15, an average particle size is 10 μm, a refractive index is 1.59) which were blended at a weight ratio of 4:1. Further, according to observation through the SEM, as shown in FIG. 8, the comparison-use film (17) was a blend of grains in which the styrene-family cross-linking polymeric grains (powder (E)) and the benzoguanamine grains were blended. FIG. 7 shows a microphotograph of the blend of grains.

Comparative Example 5

The present comparative example corresponds to Examples 6 to 10 and is not a comparative example according to the present invention.

Figure 9:
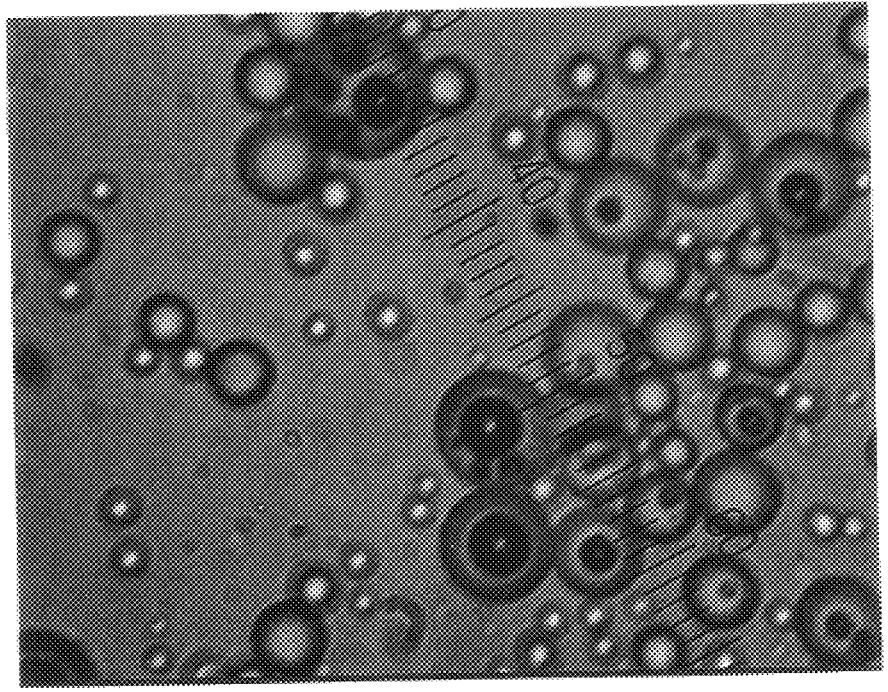
FIG. 9 is an SEM photograph showing grains according to Comparative Example 5.
Figure 10:
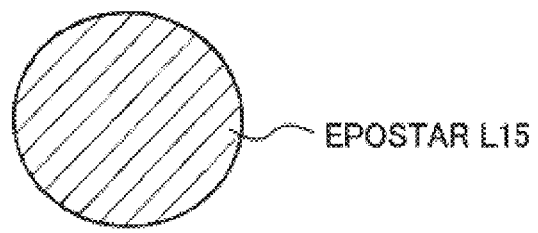
FIG. 10 is a schematic view showing a structure of the grains of Comparative Example 5.

A comparison-use film (18) was obtained by repeating the same operation as with Example 6, except that the powder (A) was replaced with the benzoguanamine grains (same as above). Further, according to observation through the SEM, as shown in FIG. 10, the comparison-use film (18) was made up of the benzoguanamine grains. FIG. 9 shows a microphotograph of the grains.

(Evaluation of Optical Properties-1)

A measurement of light-diffusing power and light transmissivity was performed with respect to the films (10) to (12) respectively obtained from Examples 6 to 10, and the comparison-use film (15) obtained in Comparative Example 2 through a procedure shown below. Namely, using a goniophotometer, horizontal light having a beam diameter of 1 mm was incident onto a light-diffusing layer in a vertical direction, and transmissivity of the emitting light was measured while changing a light-receiving angle.

Table 1 shows the resultant light transmissivity of the film.

TABLE 1

| FILM | TRANSMISSIVITY IN VERTICAL DIRECTION | ANGLE AT WHICH TRANSMISSIVITY BECOMES A HALF OF THAT IN VERTICAL DIRECTION |
|---|---|---|
| (10) | 95% | 32° |
| (11) | 95% | 28° |
| (12) | 95% | 30° |
| (15) FOR COMPARISON | 95% | 23° |

From the foregoing results, when, for example, adopting a light-diffusing film made up of a grain aggregate in which grains of two or more types bond together in a liquid crystal display device, a wide angle of visibility can be attained.

(Evaluation of Optical Properties-2)

The films (13) and (14) respectively obtained in Examples 9 and 10, or the comparison-use films (16) to (18) respectively obtained in Comparative Examples 3 to 5 were used to produce a LCD (liquid crystal) panel, thereby measuring light transmissivity of the LCD panel through a procedure shown below. Namely, as a measurement device was adopted an LCD-5200 (produced by Otsuka Electronic Co., Ltd.), and light transmissivity was measured by emitting light to the LCD panel under the condition that a measurement angle was in a range of −60° to 60°.

Figure 11:
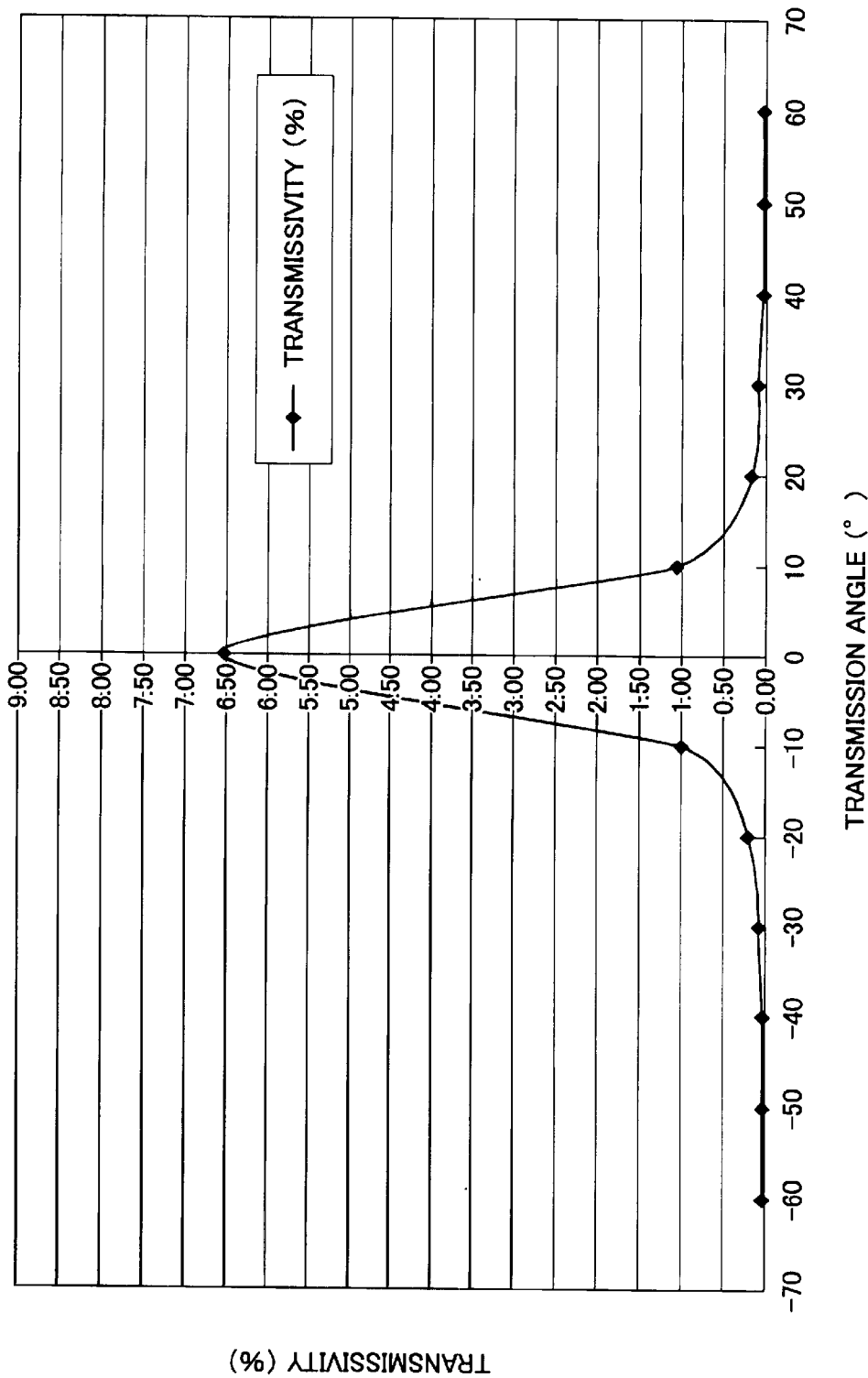
FIG. 11 is a graph showing measured values of light transmissivity of a liquid crystal panel according to Example 9.
Figure 12:
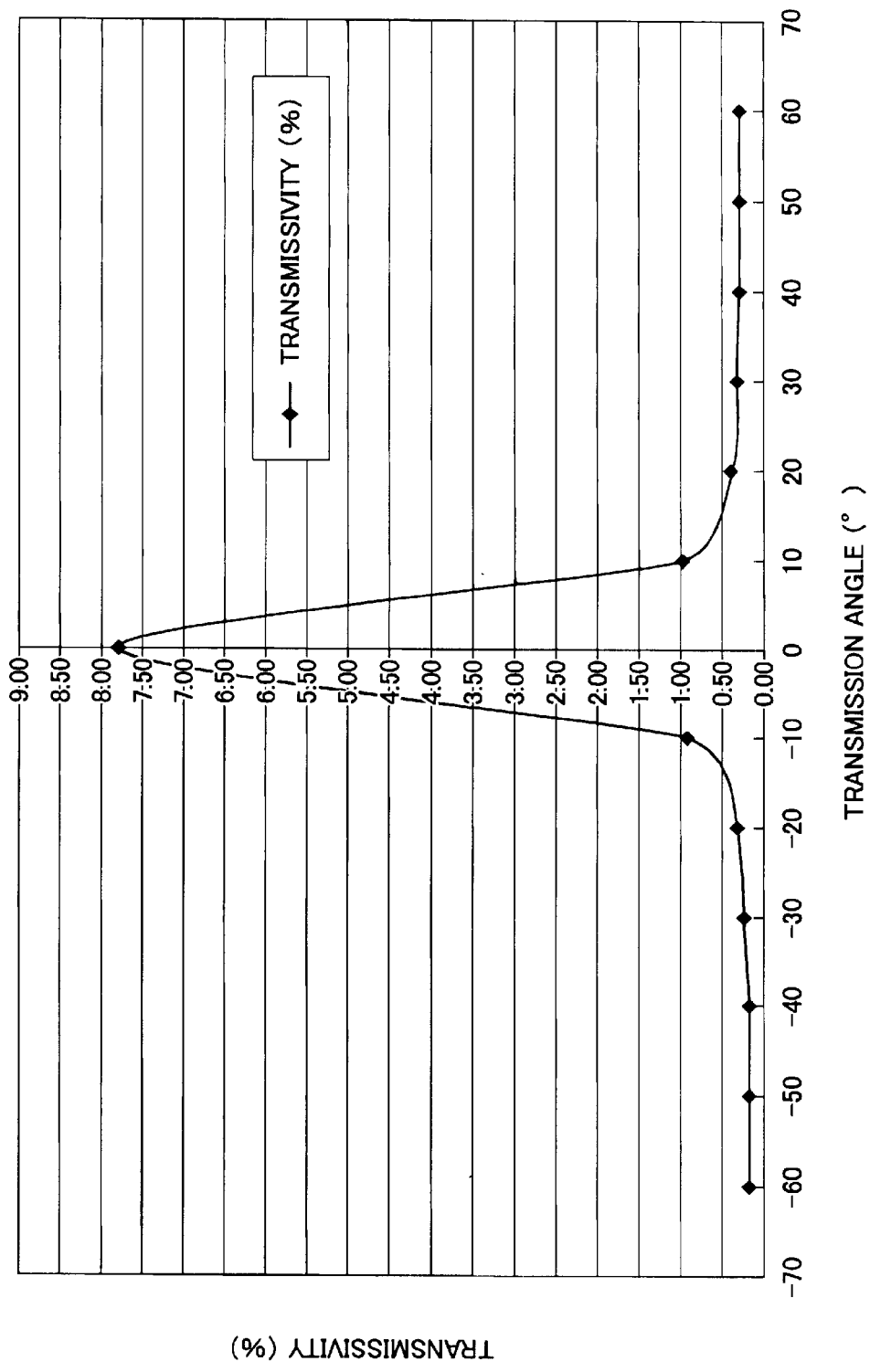
FIG. 12 is a graph showing measured values of light transmissivity of a liquid crystal panel according to Example 10.
Figure 13:
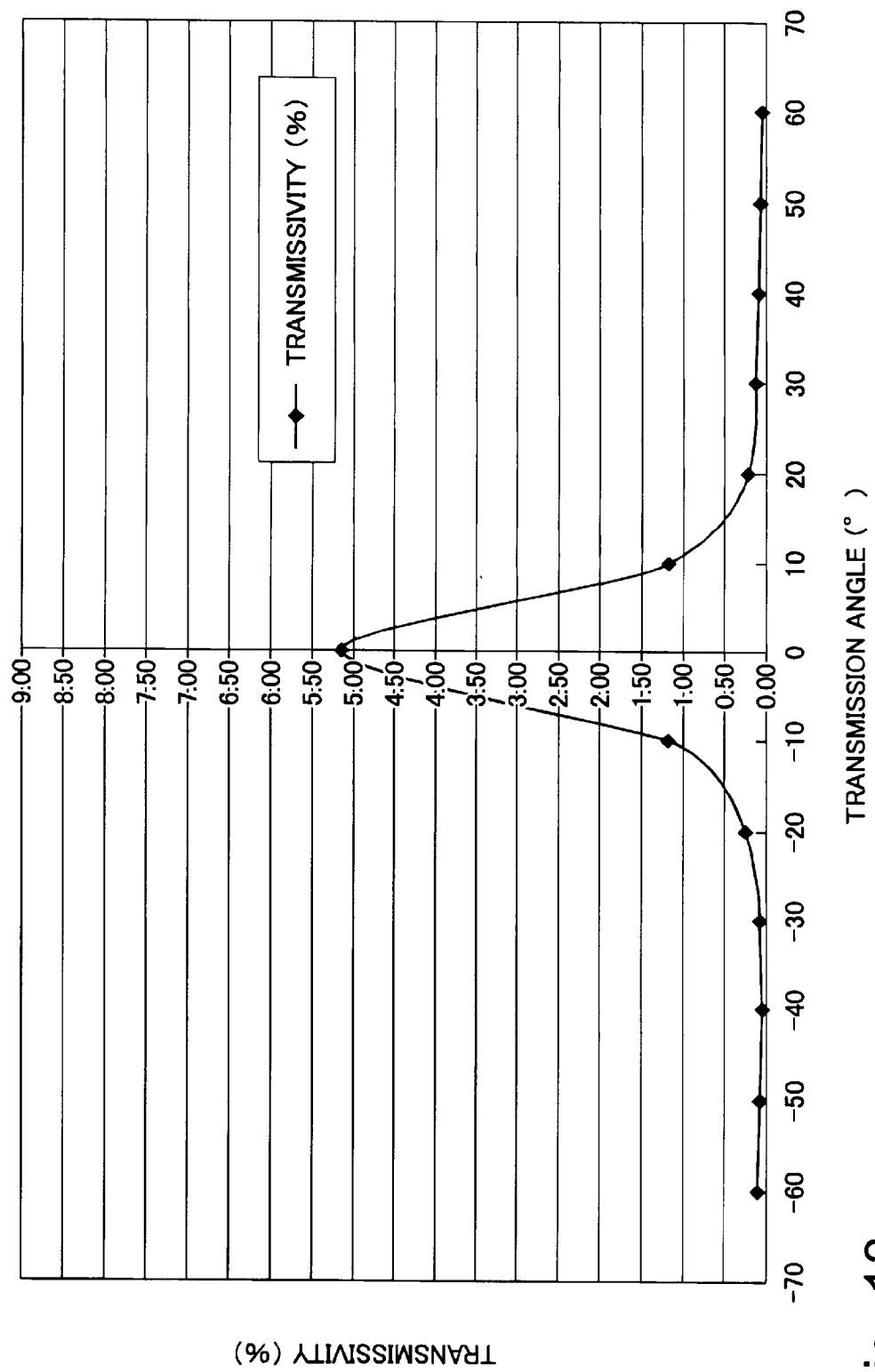
FIG. 13 is a graph showing measured values of light transmissivity of a liquid crystal panel according to the Comparative Example 3.
Figure 14:
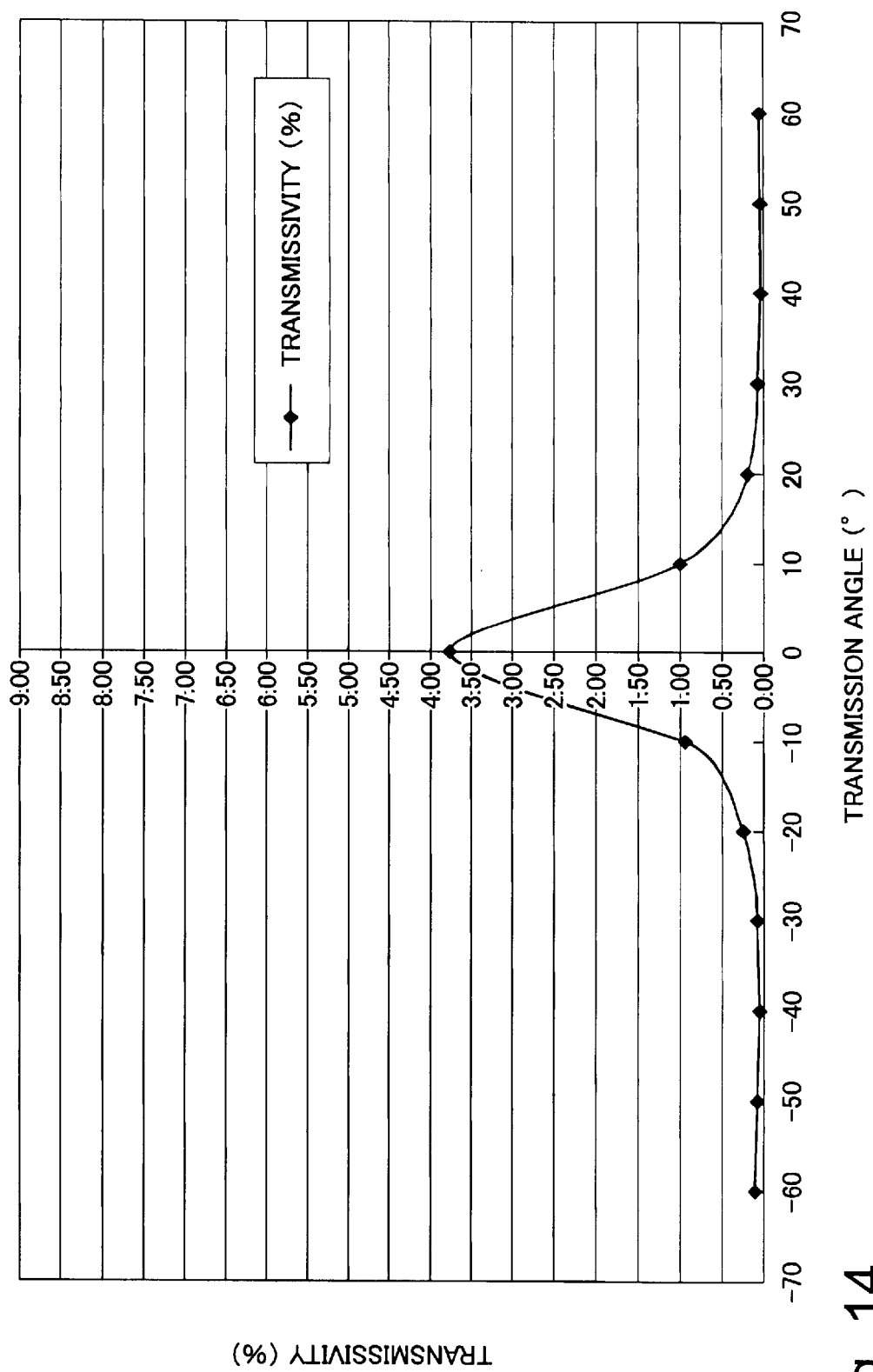
FIG. 14 is a graph showing measured values of light transmissivity of a liquid crystal panel according to the Comparative Example 4.
Figure 15:
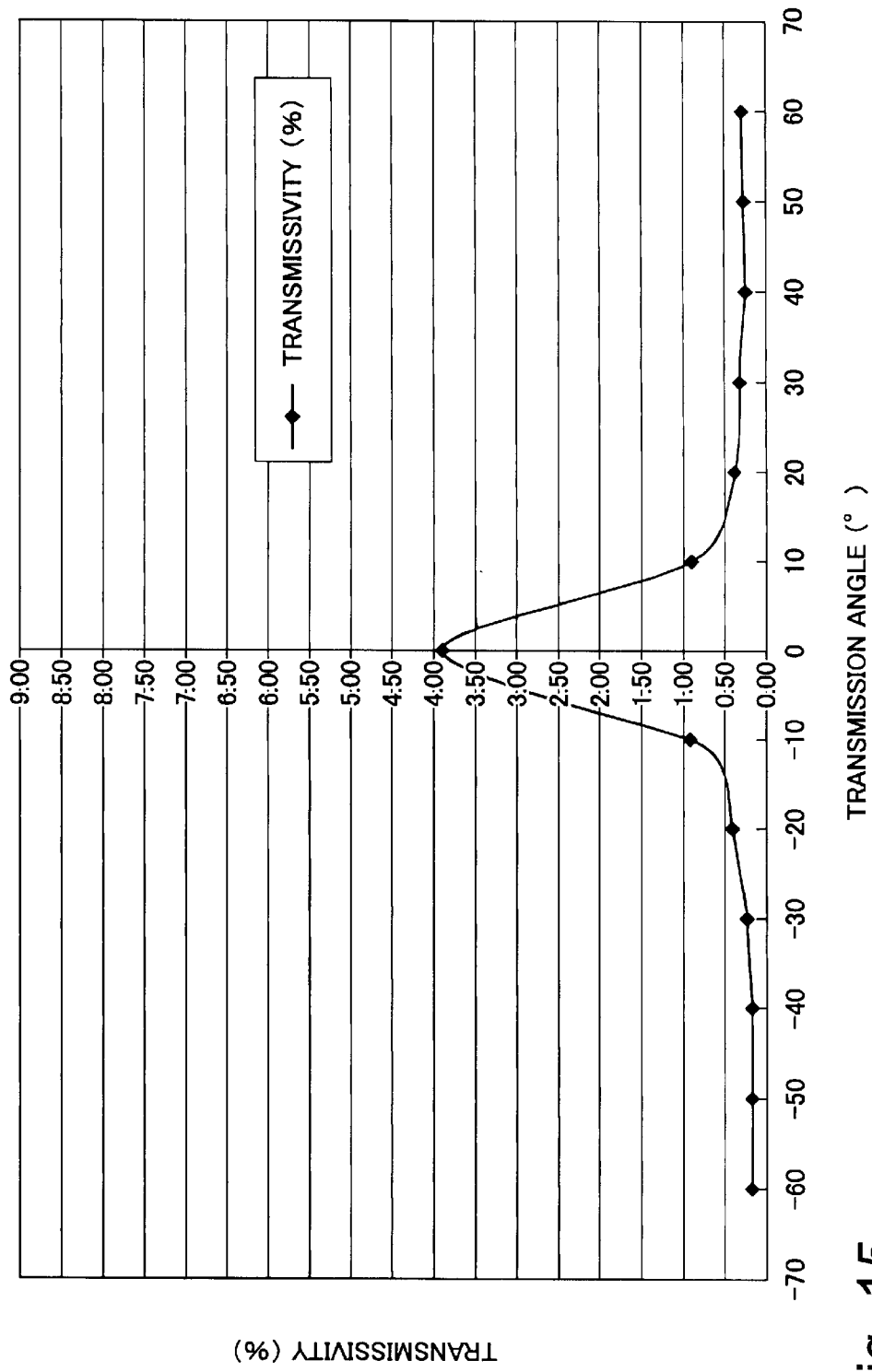
FIG. 15 is a graph showing measured values of light transmissivity of a liquid crystal panel according to the Comparative Example 5.

As to the measurement angle, a transmission angle was 0° at a point where the LCD panel and the emitting light intersected. Namely, when the transmission angle was 0°, light transmissivity was a maximum. FIG. 11 shows a graph of the measurement of light transmissivity in the film 13. Likewise, FIGS. 12, 13, 14 and 15 respectively show graphs of the measurements of light transmissivity in the film 14, the comparison-use film 16, the comparison-use film 17 and the comparison-use film 18.

Further, a blend of grains having the same composition as the films (13) and (14) respectively obtained in Examples 9 and 10 was produced so as to use it to produce a LCD panel by the same method as with Examples 9 and 10. Thereafter, light transmissivity of the LCD panel was measured under the same measurement conditions as with the LCD panels of Examples 9 and 10. A ratio of light transmissivity of the LCD panel of the grain aggregate to the LCD panel of the blend of grains will be defined as an anti-blend value, as follows:

the anti-blend value=light transmissivity of the LCD panel adopting the grain aggregate at the transmission angle 0°/light transmissivity of the LCD panel adopting the blend of grains at the transmission angle 0°

(provided that the grain aggregate and the blend of grains have the same composition and measured under the same measurement conditions).

Table 2 shows results of the measurement of light transmissivity using the LCD panels.

TABLE 2

| FILM USED | TRANSMISSIVITY AT TRANSMISSION ANGLE 0° | ANTI-BLEND VALUE |
|---|---|---|
| (13) | 6.55 | 1.3 |
| (14) | 7.77 | 2.1 |
| (16) FOR COMPARISON | 5.14 | |
| (17) FOR COMPARISON | 3.73 | |
| (18) FOR COMPARISON | 3.88 | |

The foregoing results show that the grain aggregates made up of a plurality of two or more types of grains bonding together have more improved light transmission properties than the blend of grains.

Further, the foregoing results show that using the grain aggregate made up of grains having different refractive indexes so as to form a LCD panel results in an improvement in light transmissivity at the transmission angle 0°, that is, 1.3 times to 2.1 times the light transmissivity of the LCD panel made up of the blend of grains in which grains were blended at an equal ratio.

Example 11

A blend liquid was obtained by blending the dispersion liquid (1) containing the PMMA-family cross-linking polymeric grains with the oxazoline group-containing polymer (produced by Nippon Shokubai Co., Ltd., Epocross K2020E) at a ratio of 100:10, where solid components were measured. Thereafter, the blend liquid was dried by the spray drier manufactured by Yamato Scientific Co., Ltd., under conditions shown below so as to obtain powder (G) which is a grain aggregate having the structure of the present application. The conditions are as follows:

supply velocity: 5 ml/min spray pressure: 2 kg/cm² gas volume: 0.3 m³/min inlet temperature: 150° C.

outlet temperature: 60° C.

The powder (G) thus obtained was measured by the multisizer, and the measured average particle size ②  was 9 μm. Further, according to observation through the SEM, the powder (G) was made up of a grain aggregate in which the cross-linking polymeric grains bonded together while maintaining an individual shape of each of the cross-linking polymeric grains.

Example 12

As a dispersion-use resin was adopted 100 g of polyester resin (Toyobo Co., Ltd., Vylon 200), while adopting as a dilution-use organic solvent 120 g of toluene and 30 g of methyl ethyl ketone, with which 20 g of the powder (G) obtained in Example 11 was blended, thereby obtaining a coating-use composition.

As a base material film was adopted a polyester film (produced by Toray Industries, Inc., Lumirror #100T56) having a film thickness of 100 μm, and one side of the film was coated with the coating-use composition by roll coating. This was dried for one minute by hot air drying at 120° C. so as to form a light-diffusing layer having a film thickness of 30 μm, thereby obtaining a film (20).

Comparative Example 6

The present comparative example corresponds to Example 12 and is not a comparative example according to the present invention.

A comparison-use film (21) was obtained by repeating the same operation as with Example 11, except that in lieu of 20 g of powder (G) was adopted 30 g of spherical grains of a single type (produced by Nippon Shokubai Co., Ltd., Epostar MA1010, an average particle size is 10 μm) (Evaluation of Optical Properties-3)

A measurement of light-diffusing power and light transmissivity of the film (20) obtained in Example 12 and the comparison-use film (21) was performed under the foregoing conditions shown in (Evaluation of Optical Properties-1).

Table 3 shows the resultant light transmissivity of the films.

TABLE 3

| FILM | TRANS-MISSIVITY IN VERTICAL DIRECTION | ANGLE AT WHICH TRANSMISSIVITY BECOMES A HALF OF THAT IN VERTICAL DIRECTION |
|---|---|---|
| (20) | 95% | 20° |
| (21) FOR COMPARISON | 90% | 15° |

From the foregoing results, a light-diffusing film (light-diffusing mold article) in which a plurality of cross-linking polymeric grains bond together can attain higher transmissivity and a wider angle of visibility than a light-diffusing film made up of grains of a single type.

Production Example-3

A dispersion liquid (3) containing cross-linking polymeric grains, each of which has an average particle size of 0.2 μm was obtained by repeating the same operation as with Production Example 1, except that the blend of the vinyl-family monomers contained in the pre-emulsion was replaced with 560 g of methyl methacrylate and 140 g of divinyl benzene.

Example 13

A blend liquid was obtained by sufficiently blending 16 g of an emulsion of oxazoline group-containing polymer (produced by Nippon Shokubai Co., Ltd., Epocross K2020E, a solid component is 46% by weight), that is a substance (binder) having a reactive functional group, with 200 g (37% by weight of a solid component) of the dispersion liquid (1) containing the PMMA-family cross-linking polymeric grains.

Next, the blend liquid was dried by the spray drier manufactured by Yamato Scientific Co., Ltd., under conditions shown below, so as to obtain powder (H) which is a grain aggregate having the structure of the present application. The conditions are as follows:

supply velocity: 14 ml/min
spray pressure: 2.3 kg/cm$^2$
gas volume: 0.3 m$^3$/min
inlet temperature: 150° C.
outlet temperature: 600° C.

The powder (H) thus obtained was measured by the multisizer, and the measured average particle size ② as a grain aggregate was 14 μm. Further, according to observation through the SEM, the powder (H) was made up of a grain aggregate in which the cross-linking polymeric grains bonded together while maintaining an individual shape of each of the cross-linking polymeric grains.

Example 14

Powder (I) which is a grain aggregate having the structure of the present application was obtained by repeating the same operation as with Example 13, except that in lieu of the dispersion liquid (1) containing the PMMA-family cross-linking polymeric grains was adopted the dispersion liquid (3) containing the cross-linking polymeric grains.

The powder (I) thus obtained was measured by the multisizer, and the measured average particle size ② as a grain aggregate was 14 μm. Further, according to observation through the SEM, the powder (I) was made up of a grain aggregate in which the cross-linking polymeric grains bonded together while maintaining an individual shape of each of the cross-linking polymeric grains. In addition, the powder (I) had the thermal decomposition initiating temperature of 290° C.

Comparative Example 7

The present comparative example corresponds to Examples 13 and 14 and is not a comparative example according to the present invention.

Powder (J) having an average particle size of 14 μm was obtained by repeating the same operation as with Example 13, except that the binder (oxazoline group-containing polymer) was not added. According to observation through the SEM, the powder (J) was made up of a grain aggregate in which the cross-linking polymeric grains bonded together while maintaining an individual shape of each of the cross-linking polymeric grains.

Comparative Example 8

The present comparative example corresponds to Examples 13 and 14 and is not a comparative example according to the present invention.

Comparison-use powder (K) was obtained by repeating the same operation as with Example 14, except that the binder (oxazoline group-containing polymer) was not added. According to observation through the SEM, the comparison-use powder (K) was dried intact, where a grain aggregate was not formed.

(Solvent Resistance Test-1)

5 g each of the powder (H) and (I), and the comparison-use powder (J) was separately added to 100 g of methanol, and each blend was agitated for five minutes at 8,000 rpm by a homomixer, thereafter removing a solvent, thereby measuring average particle sizes of the respective powder (grain aggregates) while observing shapes thereof through the SEM. As a result, there was no change in the average particle size of any powder, and bonding of the cross-linking polymeric grains was maintained intact.

(Solvent Resistance Test-2)

The same operation as with the Solvent Resistance Test-1 was repeated, except that methanol was replaced with toluene. As a result, there was no change in the average particle sizes while maintaining bonding of the cross-linking polymeric grains in the powder (H) and (I), whereas in the comparison-use powder (J), the average particle size was reduced to 1 μm or less, where little bonding of the cross-linking polymeric grains remained.

The foregoing results show that the grain aggregate in which the cross-linking polymeric grains bond together through the binder has more improved solvent resistance than the grain aggregate in which the grains were bonded without the binder.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A grain aggregate comprising a plurality of grains bonding together via a binder which is a substance having a reactive functional group, wherein:
    each of the plurality of grains is made of an organic substance, as differently composed cross-linking polymeric grains and/or cross-linking resin grains.

2. The grain aggregate as set forth in claim 1 formed by spray drying of a grain dispersion liquid containing the plurality of grains and the binder which is a substance having a reactive functional group.

3. The grain aggregate as set forth in claim 1, wherein each of the plurality of grains bonding together has an average particle size falling within a range of 0.01 μm to 1 μm, and the grain aggregate has an average particle size falling within a range of 2 μm to 200 μm.

4. The grain aggregate including the plurality of grains bonding together via the binder as set forth in claim 3, wherein a molecule of the binder has at least two functional groups, each of the functional groups being one selected from the group consisting of a hydroxyl group, a carboxyl group, an oxazoline group, an epoxy group, an aziridine group and an isocyanate group.

5. The grain aggregate as set forth in claim 1, wherein the plurality of grains include a grain made of an inorganic substance.

6. The grain aggregate including the plurality of grains bonding together via the binder as set forth in claim 5, wherein a molecule of the binder has at least two functional groups, each of the functional groups being one selected from the group consisting of a hydroxyl group, a carboxyl group, an oxazoline group, an epoxy group, an aziridine group and an isocyanate group.

7. The grain aggregate as set forth in claim 5, wherein the plurality of grains are made of an inorganic substance and an organic substance.

8. The grain aggregate as set forth in claim 5, wherein a thermal decomposition initiating temperature of the plurality of grains is not less than 170° C.

9. The grain aggregate as set forth in claim 1, wherein a thermal decomposition initiating temperature of the plurality of grains is not less than 170° C.

10. A producing method of a grain aggregate including a plurality of grains bonding together, wherein each of the plurality of grains is made of an organic substance, as differently composed cross-linking polymeric grains and/or cross-linking resin grains and has an average particle size falling within a range of 0.01 μm to 1 μm, and the grain aggregate has an average particle size falling within a range of 2 μm to 200 μm, comprising the step of:
    drying by spraying a dispersion liquid containing the plurality of grains.

11. The producing method of the grain aggregate as set forth in claim 10, including the step of drying by spraying a blend of a dispersion liquid containing the plurality of grains and a binder which is a substance having a reactive functional group, a molecule of the binder has at least two functional groups, each of the functional groups being one selected from the group consisting of a hydroxyl group, a carboxyl group, an oxazoline group, an epoxy group, an aziridine group and an isocyanate group.

12. The producing method of claim 10, wherein, the plurality of grains include a grain made of an inorganic substance.

13. A light-diffusing agent comprising a grain aggregate which includes a plurality of grains bonding together via a binder which is a substance having a reactive functional group, wherein each of the plurality of grains is made of an organic substance, as differently composed cross-linking polymeric grains and/or cross-linking resin grains and has an average particle size falling within a range of 0.01 μm to 1 μm, and the grain aggregate has an average particle size falling within a range of 2 μm to 200 μm.

14. The light-diffusing agent containing the plurality of grains bonding together via the binder as set forth in claim 13, wherein a molecule of the binder has at least two functional groups, each of the functional groups being one selected from the group consisting of a hydroxyl group, a carboxyl group, an oxazoline group, an epoxy group, an aziridine group and an isocyanate group.

15. The light-diffusing agent as set forth in claim 13, wherein a thermal decomposition initiating temperature of the plurality of grains is not less than 170° C.

16. The light-diffusing agent containing the plurality of grains bonding together via the binder as set forth in claim 15, wherein a molecule of the binder has at least two functional groups, each of the functional groups being one selected from the group consisting of a hydroxyl group, a carboxyl group, an oxazoline group, an epoxy group, an aziridine group and an isocyanate group.

17. The light-diffusing agent of claim 13, wherein the plurality of grains include a grain made of an inorganic substance.

18. A light-diffusing mold article which contains a light-diffusing agent containing a grain aggregate including a plurality of grains bonding together via a binder which is a substance having a reactive functional group, wherein each of the plurality of grains is made of an organic substance, as differently composed cross-linking polymeric grains and/or cross-linking resin grains and has an average particle size falling within a range of 0.01 μm to 1 μm, and the grain aggregate has an average particle size falling within a range of 2 μm to 200 μm.

19. The light-diffusing mold article including the plurality of grains bonding together via the binder as set forth in claim 18, wherein a molecule of the binder has at least two functional groups, each of the functional groups being one selected from the group consisting of a hydroxyl group, a carboxyl group, an oxazoline group, an epoxy group, an aziridine group and an isocyanate group.

20. The light-diffusing mold article as set forth in claim 18, wherein a thermal decomposition initiating temperature of the plurality of grains is not less than 170° C.

21. The light-diffusing mold article including the plurality of grains bonding together via the binder as set forth in claim 20, wherein a molecule of the binder has at least two functional groups, each of the functional groups being one selected from the group consisting of a hydroxyl group, a carboxyl group, an oxazoline group, an epoxy group, an aziridine group and an isocyanate group.

22. The light-diffusing mold article of claim 18, wherein the plurality of grains include a grain made of an inorganic substance.

* * * * *